United States Patent
Choi et al.

(10) Patent No.: US 9,515,341 B2
(45) Date of Patent: Dec. 6, 2016

(54) POROUS MEMBRANE, ELECTROLYTE MEMBRANE INCLUDING SAME, METHODS OF MANUFACTURING BOTH, AND FUEL CELL INCLUDING AT LEAST ONE OF THE MEMBRANES

(75) Inventors: Seong-woo Choi, Yongin-si (KR); Jong-chan Lee, Seoul (KR); Ki-hyun Kim, Yongin-si (KR); Sung-kon Kim, Seoul (KR); Pil-won Heo, Yongin-si (KR); Ki-hyun Kim, Seoul (KR)

(73) Assignees: SAMSUNG ELECTRONICS CO., LTD. (KR); SEOUL NATIONAL UNIVERSITY R&DB FOUNDATION (KR)

( * ) Notice: Subject to any disclaimer, the term of this patent is extended or adjusted under 35 U.S.C. 154(b) by 1046 days.

(21) Appl. No.: 13/585,472

(22) Filed: Aug. 14, 2012

(65) Prior Publication Data
US 2013/0045436 A1   Feb. 21, 2013

(30) Foreign Application Priority Data

Aug. 18, 2011 (KR) .................. 10-2011-0082340

(51) Int. Cl.
*H01M 8/10* (2016.01)
*C08J 5/22* (2006.01)

(52) U.S. Cl.
CPC .............. *H01M 8/103* (2013.01); *C08J 5/22* (2013.01); *H01M 8/1044* (2013.01); *H01M 8/1051* (2013.01); *H01M 8/1072* (2013.01); *H01M 8/1081* (2013.01); *C08J 2379/06* (2013.01); *H01M 2300/0082* (2013.01); *H01M 2300/0091* (2013.01); *Y02E 60/521* (2013.01); *Y02P 70/56* (2015.11)

(58) Field of Classification Search
CPC .............. H01M 2300/0082; H01M 8/1027; Y02E 60/521; C08G 18/0828; C08G 75/23; C08G 2261/3444
See application file for complete search history.

(56) References Cited

U.S. PATENT DOCUMENTS

| 5,964,903 A * | 10/1999 | Gao .................... H01M 2/1653 29/623.1 |
|---|---|---|
| 2005/0256296 A1 | 11/2005 | Kiefer et al. |
| 2006/0008690 A1 | 1/2006 | Uensal et al. |
| 2007/0275285 A1 * | 11/2007 | Choi .................... H01B 1/122 429/492 |
| 2008/0003480 A1 | 1/2008 | Martin |

(Continued)

FOREIGN PATENT DOCUMENTS

| EP | 2202261 A1 | 6/2010 |
|---|---|---|
| EP | 2253654 A1 | 11/2010 |

(Continued)

OTHER PUBLICATIONS

Extended European Search Report for Application No. 12180135.1-2119 dated Dec. 14, 2012.
"Porous Polybenzimidazole Membranes Doped with Phosphoric Acid: Highly Proton-Conducting Solid Electrolytes" published in Chem. Mater, 2004, 16, 604-607.

*Primary Examiner* — Shane Fang
(74) *Attorney, Agent, or Firm* — Cantor Colburn LLP

(57) ABSTRACT

A porous membrane with pores that includes a polymerization product of a polyazole-based material, an electrolyte membrane including the porous membrane with a proton-conductive polymer provided in pores of the porous membrane, methods of manufacturing the porous membrane and the electrolyte membrane, and a fuel cell employing at least one of the porous membrane and the electrolyte membrane.

22 Claims, 4 Drawing Sheets

(56) References Cited

U.S. PATENT DOCUMENTS

2008/0275146 A1* 11/2008 McGrath .............. B01D 69/141
                                                  521/27
2009/0098437 A1* 4/2009 Choi ...................... C08G 73/18
                                                  429/410

FOREIGN PATENT DOCUMENTS

| | | |
|---|---|---|
| JP | 2005-139318 | 6/2005 |
| KR | 2001-0042819 | 5/2001 |
| KR | 10-2007-0084164 | 8/2007 |

* cited by examiner

POROUS MEMBRANE, ELECTROLYTE MEMBRANE INCLUDING SAME, METHODS OF MANUFACTURING BOTH, AND FUEL CELL INCLUDING AT LEAST ONE OF THE MEMBRANES

CROSS-REFERENCE TO RELATED APPLICATION

This application claims the benefit of Korean Patent Application No. 10-2011-0082340, filed on Aug. 18, 2011 in the Korean Intellectual Property Office, the disclosure of which is incorporated herein by reference.

BACKGROUND OF THE INVENTION

1. Field of the Invention

Aspects of the present invention relate to a porous membrane, an electrolyte membrane including the porous membrane, methods of manufacturing the porous membrane and the electrolyte membranes, and a fuel cell including at least one of the porous membrane and the electrolyte membrane.

2. Description of the Related Art

Fuel cells are a future source of clean energy that is an alternative to fossil energy, and have high output density and high energy conversion efficiency, which means fuel cells are applicable in a vast range of fields such as in pollution-free vehicles, domestic power generating systems, and mobile electronic appliances such as mobile communication devices, medical equipment, and various devices for military and aerospace uses.

A fuel cell includes a cathode, an anode, and an electrolyte membrane disposed between the cathode and the anode. In the anode, to which fuel gas is supplied, oxidation of the fuel gas takes place. In the cathode, to which oxygen is supplied, a reduction reaction of oxygen occurs. Electrons generated from the cathode and anode reactions generate electricity, and collaterally generate heat and moisture.

A high-temperature fuel cell mostly uses phosphoric acid as an electrolyte. Thus, such a system needs an electrolyte membrane that is able to absorb a sufficient amount of phosphoric acid and withhold it from being drawn out of the electrolyte membrane, and a system that has high durability. However, electrolyte membranes known so far are not satisfactory in terms of durability and ionic conductivity to offer a fuel cell providing sufficient efficiency. Therefore, improvement in this regard is still necessary.

SUMMARY OF THE INVENTION

Aspects of the present invention provide a porous membrane, an electrolyte membrane including the porous membrane, methods of manufacturing the porous membrane and the electrolyte membranes, and a fuel cell including at least one of the porous membrane and the electrolyte membrane According to an aspect of the present invention, a porous membrane with pores includes a polymerization product of at least one of the compounds represented by Formulae 1 to 6 below and a polyazole-based material:

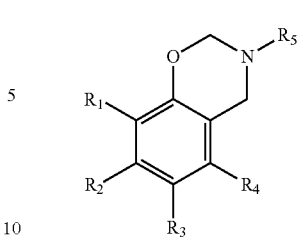

Formula 1 wherein, in Formula 1, $R_1$, $R_2$, $R_3$ and $R_4$ are each independently a hydrogen atom, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, a halogen atom, a hydroxy group, or a cyano group; and $R_5$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group,

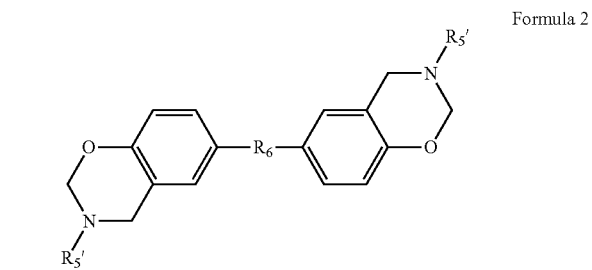

Formula 2 wherein in Formula 2, $R_5'$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group; and $R_6$ is selected from the group consisting of a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_2$-$C_{20}$ heteroarylene group, —C(=O)—, and —SO$_2$—,

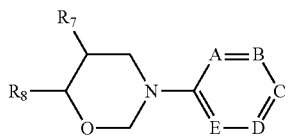

Formula 3 herein in Formula 3, A, B, C, D and E are all carbon; or one or two of A, B, C, D and E is nitrogen and the others are carbon, and $R_7$ and $R_8$ are linked to form a ring, wherein the ring is a $C_6$-$C_{10}$ cycloalkyl group, a $C_3$-$C_{10}$ heteroaryl group, a fused $C_3$-$C_{10}$ heteroaryl group, a $C_3$-$C_{10}$ heterocyclic group or a fused $C_3$-$C_{10}$ heterocyclic group,

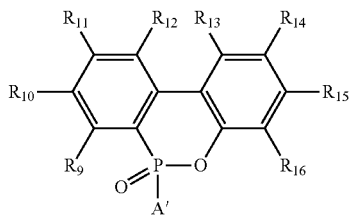

Formula 4 wherein in Formula 4, A' is a substituted or unsubstituted $C_1$-$C_{20}$ heterocyclic group, a substituted or unsubstituted $C_4$-$C_{20}$ cycloalkyl group, or a substituted or unsubstituted $C_1$-$C_{20}$ alkyl group; and $R_9$ to $R_{16}$ are each independently a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a $C_1$-$C_{20}$ heteroaryl group, a $C_1$-$C_{20}$ heteroaryloxy group, a $C_4$-$C_{20}$ cycloalkyl group, a $C_1$-$C_{20}$ heterocyclic group, a halogen atom, a cyano group, or a hydroxy group,

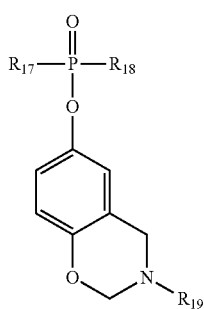

Formula 5 herein in Formula 5, $R_{17}$ and $R_{18}$ are each independently a $C_1$-$C_{20}$ alkyl group, a $C_1$-$C_{20}$ alkoxy group, a $C_6$-$C_{20}$ aryl group, a $C_6$-$C_{20}$ aryloxy group or a group represented by Formula 5A below:

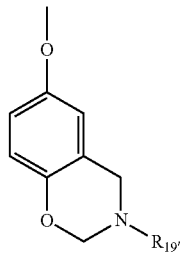

Formula 5A wherein in Formulae 5 and 5A, $R_{19}$ and $R_{19}'$ are each independently a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ cycloalkyl group, a halogenated $C_4$-$C_{20}$ cycloalkyl group, a $C_1$-$C_{20}$ heterocyclic group or a halogenated $C_1$-$C_{20}$ heterocyclic group,

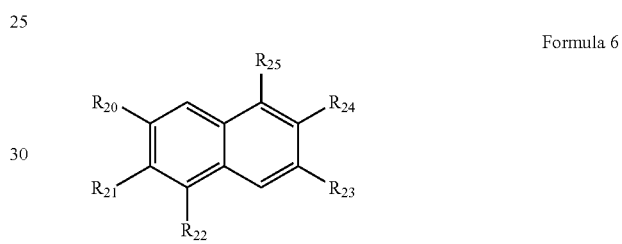

Formula 6 in Formula 6, at least two adjacent groups selected from among $R_{20}$, $R_{21}$, and $R_{22}$ are linked to form a group represented by Formula 6A below;

the unselected rest of $R_{20}$, $R_{21}$ and $R_{22}$ is a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbon ring group, a halogenated $C_4$-$C_{20}$ carbon ring group, a $C_1$-$C_{20}$ heterocyclic group or a halogenated $C_1$-$C_{20}$ heterocyclic group;

at least two adjacent groups selected from among $R_{23}$, $R_{24}$, and $R_{25}$ are linked to form a group represented by Formula 2A below; and the unselected rest of $R_{23}$, $R_{24}$ and $R_{25}$ is a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbon ring group, a halogenated $C_4$-$C_{20}$ carbon ring group, a $C_1$-$C_{20}$ heterocyclic group or a halogenated $C_1$-$C_{20}$ heterocyclic group,

Formula 6A in Formula 6A, $R_1'$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbon ring group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group; and \* denotes the sites at which the at least two adjacent groups selected from among $R_{20}$, $R_{21}$ and $R_{22}$ of Formula 6 and the at least two adjacent groups selected from among $R_{23}$, $R_{24}$ and $R_{25}$ are linked, respectively.

According to another aspect of the present invention, an electrolyte membrane includes the above-described porous membrane; and a proton-conductive polymer provided in pores of the porous membrane.

According to another aspect of the present invention, a method of preparing a porous membrane includes: preparing a mixture of at least one of the compounds represented by Formulae 1 to 6 above, a polyazole-based material, an organic solvent, and a pore forming agent; thermally-treating the mixture; and removing the pore forming agent from the thermal-treated product to form the porous membrane.

The thermal treating of the mixture and the removing of the pore forming agent may include coating the mixture on a substrate; thermal treatment; separating the thermal-treated product from the substrate to obtain a film; and removing the pore forming agent from the film to obtain the porous membrane.

The removing of the pore forming agent may include immersing the film in an alcohol-based solvent.

According to another aspect of the present invention, a method of preparing the above-described electrolyte membrane includes: mixing a proton-conductive polymer and an organic solvent to obtain a proton-conductive polymer solution; and providing pores of a porous membrane with a proton-conductive polymer contained in the proton-conductive polymer solution.

The method may further include a protonating process.

The protonating process may include an acid treatment process using sulfuric acid.

The impregnating of the pores of the porous membrane with the proton-conductive polymer may include immersing the porous membrane in the proton-conductive polymer solution, drawing the porous membrane out of the proton-conductive polymer solution, and removing the organic solvent from the porous membrane.

According to another aspect of the present invention, a fuel cell includes the above-described porous membrane.

According to another aspect of the present invention, a fuel cell includes the above-described porous membrane; and an electrolyte membrane including a proton-conductive polymer provided in pores of the porous membrane.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE EMBODIMENTS

Figure 1:
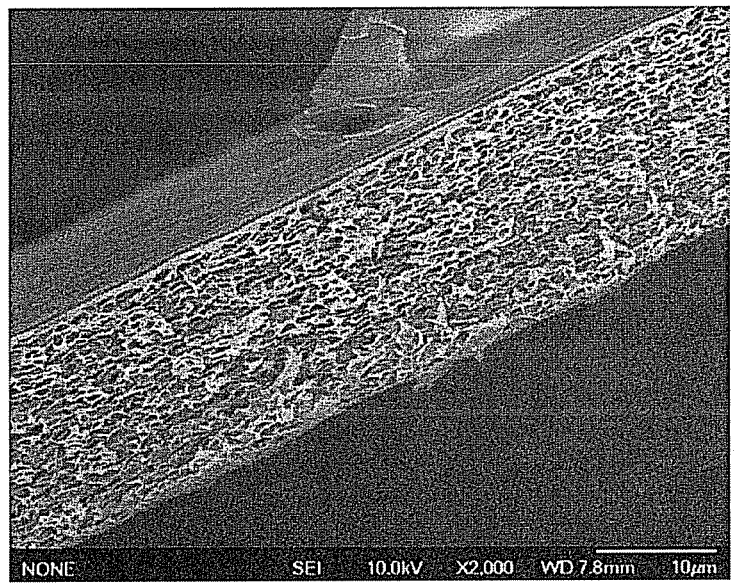
FIGS. 1 to 4 are scanning electron microscopic (SEM) images of cross-sections of porous membranes manufactured according to Examples 1 to 4, respectively.
Figure 2:
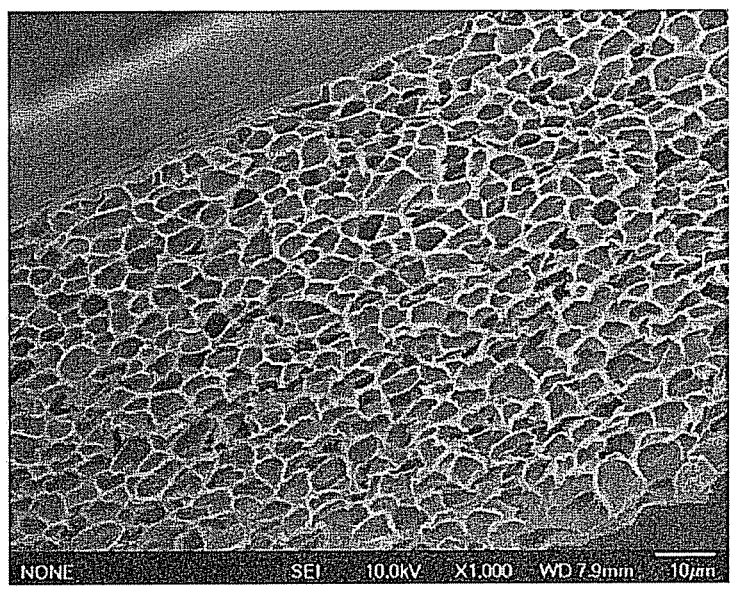
Figure 3:
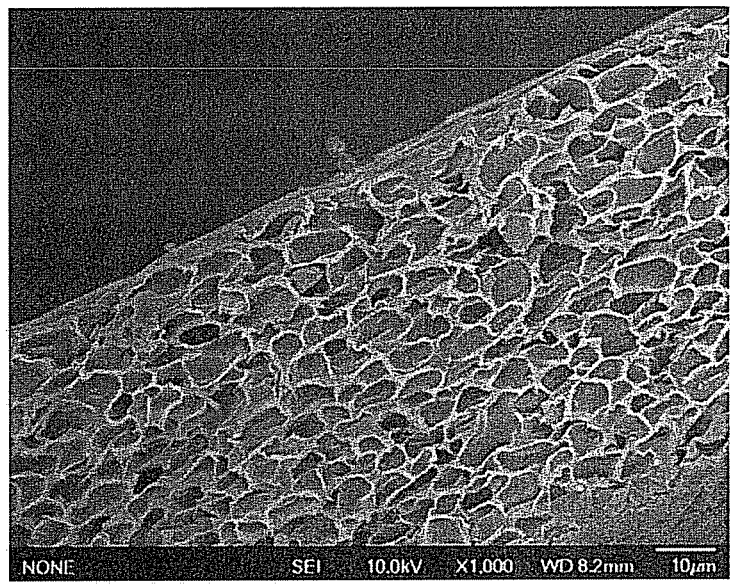
Figure 4:
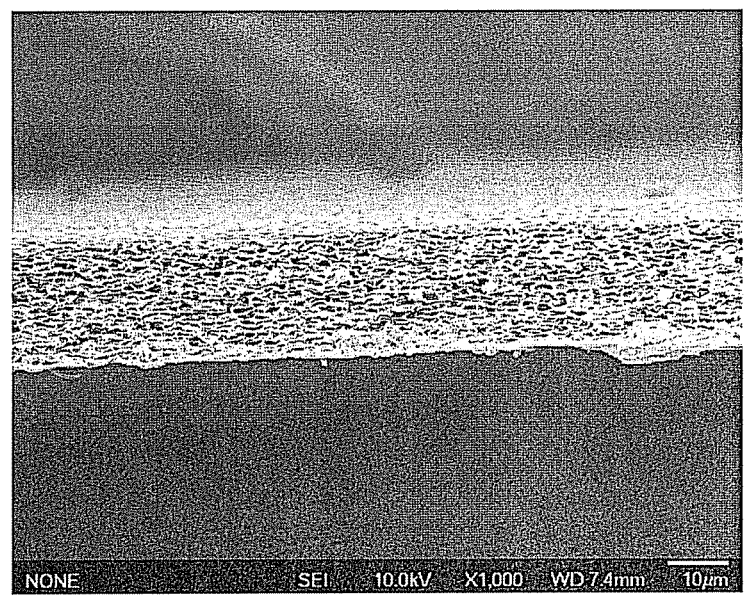

Reference will now be made in detail to the present embodiments of the present invention, examples of which are illustrated in the accompanying drawings. The embodiments are described below in order to explain the present invention. As used herein, the term "and/or" includes any and all combinations of one or more of the associated listed. Expressions such as "at least one of," when preceding a list of elements, modify the entire list of elements and do not modify the individual elements of the list.

According to an aspect of the present invention a porous membrane includes a polymerization product of at least one of the compounds represented by Formulae 1 to 6 below and a polyazole-based material:

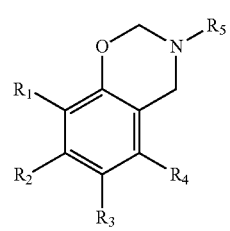

Formula 1 wherein in Formula 1, $R_1$, $R_2$, $R_3$ and $R_4$ are each independently a hydrogen atom, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, a halogen atom, a hydroxy group, or a cyano group; and $R_5$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group.

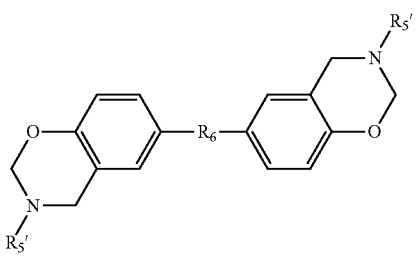

Formula 2 wherein in Formula 2, $R_5'$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbocyclic group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group; and $R_6$ is selected from the group consisting of a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_2$-$C_{20}$ heteroarylene group, —C(=O)—, and —SO$_2$—.

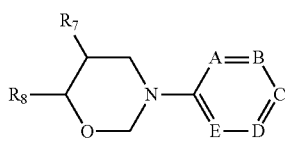

Formula 3 wherein in Formula 3, A, B, C, D and E are all carbon; or one or two of A, B, C, D and E is nitrogen and the others are carbon; and $R_7$ and $R_8$ are linked to form a ring, wherein the ring is a $C_6$-$C_{10}$ cycloalkyl group, a $C_3$-$C_{10}$ heteroaryl group, a fused $C_3$-$C_{10}$ heteroaryl group, a $C_3$-$C_{10}$ heterocyclic group or a fused $C_3$-$C_{10}$ heterocyclic group.

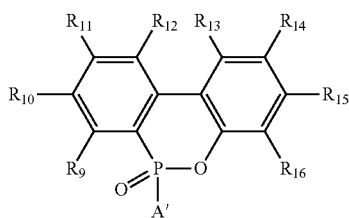

Formula 4 wherein in Formula 4, A' is a substituted or unsubstituted $C_1$-$C_{20}$ heterocyclic group, a substituted or unsubstituted $C_4$-$C_{20}$ cycloalkyl group, or a substituted or unsubstituted $C_1$-$C_{20}$ alkyl group; and $R_9$ to $R_{16}$ are each independently a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a $C_1$-$C_{20}$ heteroaryl group, a $C_1$-$C_{20}$ heteroaryloxy group, a $C_4$-$C_{20}$ cycloalkyl group, a $C_1$-$C_{20}$ heterocyclic group, a halogen atom, a cyano group, or a hydroxy group.

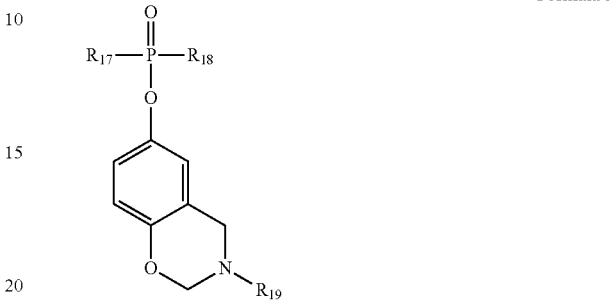

Formula 5 wherein in Formula 5, $R_{17}$ and $R_{18}$ are each independently a $C_1$-$C_{20}$ alkyl group, a $C_1$-$C_{20}$ alkoxy group, a $C_6$-$C_{20}$ aryl group, a $C_6$-$C_{20}$ aryloxy group or a group represented by Formula 5A below:

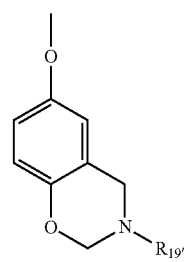

Formula 5A wherein in Formulae 5 and 5A, $R_{19}$ and $R_{19}'$ are each independently a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ cycloalkyl group, a halogenated $C_4$-$C_{20}$ cycloalkyl group, a $C_1$-$C_{20}$ heterocyclic group or a halogenated $C_1$-$C_{20}$ heterocyclic group.

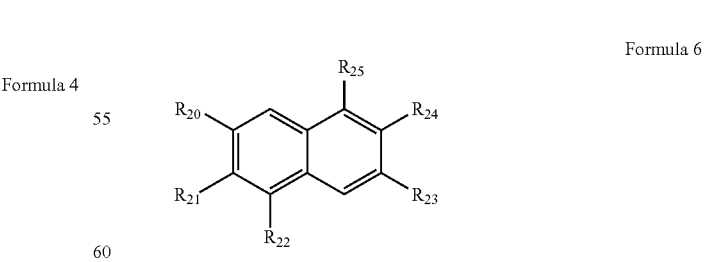

Formula 6 wherein in Formula 6, at least two adjacent groups selected from among $R_{20}$, $R_{21}$ and $R_{22}$ are linked to form a group represented by Formula 2A below, and the non-selected, remaining group is a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbon ring group, a halogenated $C_4$-$C_{20}$ carbon ring group, a $C_1$-$C_{20}$ heterocyclic group or a halogenated $C_1$-$C_{20}$ heterocyclic group; and at least two adjacent groups selected from among $R_{23}$, $R_{24}$ and $R_{25}$ are linked to form the group represented by Formula 2A below, and the non-selected, remaining group is a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbon ring group, a halogenated $C_4$-$C_{20}$ carbon ring group, a $C_1$-$C_{20}$ heterocyclic group or a halogenated $C_1$-$C_{20}$ heterocyclic group.

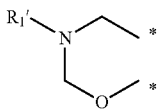

Formula 6A wherein in Formula 6A, $R_1'$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbon ring group, a substituted or unsubstituted $C_4$-$C_{20}$ carbocyclic alkyl group, a substituted or unsubstituted $C_2$-$C_{20}$ heterocyclic group, or a substituted or unsubstituted $C_2$-$C_{20}$ heterocyclic alkyl group; and \* denotes the sites at which the at least two adjacent groups selected from among $R_{20}$, $R_{21}$ and $R_{22}$ of Formula 6 and the at least two adjacent groups selected from among $R_{23}$, $R_{24}$ and $R_{25}$ are linked, respectively.

In Formula 6A, $R_1$ is selected from the groups represented by Formula 7.

Formula 7

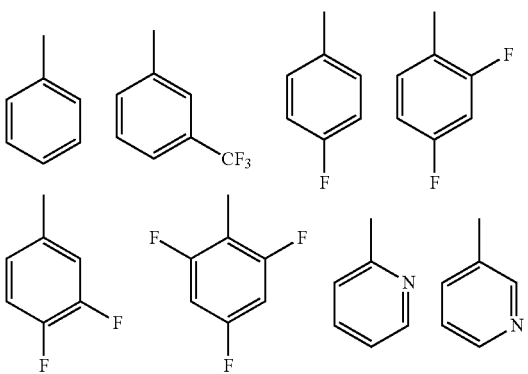

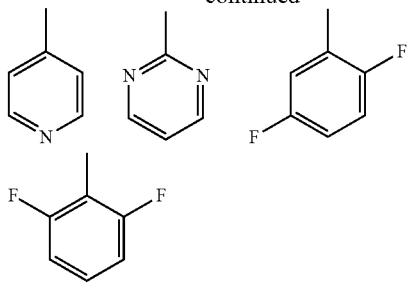

-continued

The amount of the polyazole-based material may be from about 5 parts by weight to about 120 parts by weight, and in some embodiments, may be from about 40 parts by weight to about 210 parts by weight, and in some other embodiments, may be from about 80 parts by weight to about 120 parts by weight, and in some other embodiments, may be about 100 parts by weight, based on 100 parts by weight of at least one of the compounds of Formulae 1 to 6. When the amount of the polyazole-based material is within these ranges, mechanical strength of the porous membrane may be high.

The porous membrane may have a total pore area from about 100 m$^2$/g to about 200 m$^2$/g, and in some embodiments, may have a total pore area of from about 107 m$^2$/g to about 172 m$^2$/g.

The porous membrane may have a porosity from about 40% to about 80%, and in some embodiments, may have a porosity of from about 65% to about 67%.

When the total pore area and the porosity of the porous membrane are within these ranges, the porous membrane may have high chemical stability without degradation in mechanical properties.

The porous membrane may have an average pore diameter from about 0.001 μm to about 0.5 μm, and in some embodiments, may have an average pore diameter from about 0.02 μm to about 0.07 μm. When the average pore diameter of the porous membrane is within these ranges, the porous membrane may have high conductivity without degradation in mechanical properties.

The porous membrane may have a density from about 0.3 g/cm$^3$ to about 1.5 g/cm$^3$, and in some embodiments, may have a density from about 0.51 g/cm$^3$ to about 0.77 g/cm$^3$.

When the density of the porous membrane is within these ranges, the porous membrane may have improved chemical and mechanical properties.

The total pore area, average pore diameter, porosity, and density of the porous membrane may be measured using an AutoPore IV 9500 (available from MicroMeritics Inc.).

In the porous membrane the polymerization product of at least one of the compounds of Formulas 1 to 6 and the polyazole-based material may be linked with a proton-conductive polymer via a chemical bond.

The chemical bond may be an ionic bond or a hydrogen bond.

The polymerization product is insoluble in a solvent that dissolves the proton-conductive polymer.

The solvent may be at least one selected from among N-methylpyrrolidone (NMP), N,N'-dimethylacetamide, and N,N'-dimethylformamide.

Hereinafter, a method of manufacturing the porous membrane according to an embodiment of the present invention will be described.

First, at least one of the compounds of Formulae 1 to 6, a polyazole-based material, an organic solvent, and a pore forming agent are mixed together.

In preparing the mixture, the order of adding at least one of the compounds of Formulae 1 to 6, the polyazole-based material, the organic solvent, and the pore forming agent is not specifically limited.

For example, at least one of the compounds of Formulae 1 to 6, a polyazole-based material, an organic solvent, and a pore forming agent may be mixed together at the same time. In one embodiment, at least one of the compounds of Formulae 1 to 6 and a polyazole-based material may be first dissolved in an organic solvent, and then a pore forming agent may be added to the solution and mixed together.

Then, the mixture is thermally treated.

The organic solvent may be removed during the thermal treatment of the mixture. In an embodiment, separate from the thermal treatment of the mixture, a process of removing the organic solvent from the mixture may be performed before the thermal treatment of the mixture.

Then, the pore forming agent is removed from the thermal treatment product, thereby preparing the porous membrane.

The thermal treatment temperature may be from about 80° C. to about 220° C., and in another embodiment, may be about 220° C. Within these temperature ranges the polymerization of at least one of the compounds of Formulae 1 to 6 and the polyazole-based material takes place.

The polymerization reaction may produce a copolymerization product and/or a cross-linked product of at least one of the compounds of Formulae 1 to 6 and the polyazole-based material. In another embodiment the polymerization reaction may produce a graft copolymer obtained by graft polymerization of at least one polymer selected from among the compounds of Formulae 1 to 6 with the polyazole-based material.

As used herein, the term "the polymerization product of at least one of the compounds of Formulae 1 to 6 and a polyazole-based material" may refer to any of the copolymerization product, the cross-linked product, and/or the graft copolymer described above.

In manufacturing the porous membrane, for example, after coating of the mixture on a substrate, the thermal treatment may be performed.

In another embodiment, before the thermal treatment, the organic solvent may be removed from the coated product.

The method of coating the mixture on the substrate is not particularly limited. Non-limiting examples of the coating method include coating using a doctor blade, bar coating, and screen printing.

The substrate may be a glass substrate, a polyethyleneterephthalate (PET) film, a biaxially oriented polyester film, or the like.

The thermal treatment may be followed by cooling to room temperature (about 25° C.) and separating the film from the substrate.

After the separation of the film, the pore forming agent is removed from the film, thereby manufacturing the porous membrane.

The pore forming agent may be at least one compound selected from among a phthalate-based material, an alkali metal carbonate, an alkali earth metal carbonate, and a carbonate-based material.

The phthalate-based material may beat least one compound selected from dibutyl phthalate (DBP), dioctyl phthalate, butylbenzyl phthalate, diisodecyl phthalate, diisononyl phthalate, diethylhexyl phthalate, diethyl phthalate, dipentyl phthalate, dipropyl phthalate, and a mixture thereof.

The alkali metal carbonate and the alkali earth metal carbonate may be at least one compound selected from the group consisting of sodium hydrogen carbonate ($NaHCO_3$), potassium hydrogen carbonate ($KHCO_3$), lithium carbonate ($Li_2CO_3$), and calcium carbonate ($CaCO_3$).

Examples of the carbonate-based material include ethylene carbonate, diethyl carbonate, and dimethyl carbonate.

The process of removing the pore forming agent depends on the kind of the pore forming agent. For example, when the pore forming agent is a phthalate-based material, the pore forming agent may be removed by dissolving with alcohol the. The alcohol may be methanol, ethanol, or the like.

When the pore forming agent is a thermally decomposable material such as an alkali metal carbonate or an alkali earth metal carbonate, the pore forming agent may be removed during the thermal treatment.

The amount of the pore forming agent may be from about 20 parts by weight to about 120 parts by weight, and in some embodiments, may be from about 70 parts by weight to about 90 parts by weight, based on 100 parts by weight of the total weight of at least one of the compounds of Formulae 1-6 and the polyazole-based material.

The organic solvent may be at least one selected from the group consisting of N,N'-dimethylacetamide (DMAc), N-methylpyrrolidone (NMP), and dimethylformamide.

The thermal treatment temperature may be from about 80° C. to about 220° C.

The porous membrane may be applicable in various fields such as, for example, an electrolyte membrane or a gaseous electrolyte membrane, by adjusting the porous membrane's porosity and the composition of the material provided in pores of the porous membrane. The porous membrane has high mechanical and chemical stabilities, and thus may be used as a support.

According to another embodiment of the present invention, an electrolyte membrane includes the porous membrane, the pores of which are impregnated with a proton-conductive polymer. This electrolyte membrane may have high ionic conductivity and mechanical properties, and may be used as a non-phosphoric acid-based electrolyte membrane. By using the electrolyte membrane, a fuel cell with improved cell performance, for example, in terms of ionic conductivity and lifespan, may be manufactured.

The proton-conductive polymer may be a polymer with a proton-conductive functional group and capable of providing a proton source. The proton-conductive polymer may be an acidic polymer with an acidic group such as phosphoric acid, sulfuric acid, or sulfonic acid.

The amount of the proton-conductive polymer may be from about 10 parts by weight to about 150 parts by weight, and in some embodiments, may be from about 10 parts by weight to about 80 parts by weight, based on 100 parts by weight of the porous membrane.

When the amount of the proton-conductive polymer is within these ranges, the electrolyte membrane may have high durability without a reduction in conductivity.

The proton-conductive polymer may be, for example, a sulfonated polymer.

The sulfonated polymer may be at least one polymer selected from the group consisting of sulfonated polyarylene ether, sulfonated polyarylene ether sulfone, sulfonated polyimide, and sulfonated polyether ether ketone.

The sulfonated polyarylene ether sulfone may be, for example, a polymer having a repeating unit represented by Formula 8A or a repeating unit represented by Formula 8B, Formula 8A

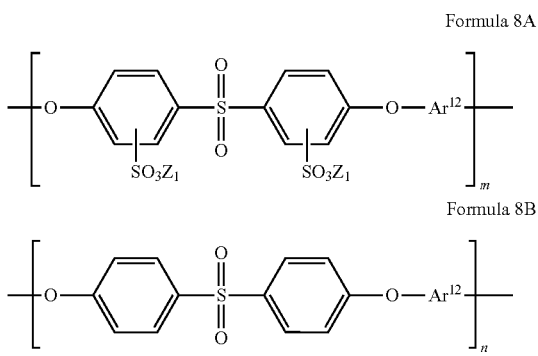

Formula 8B wherein in Formulae 8A and 8B, $Ar^{12}$ is a substituted or unsubstituted $C_6$-$C_{20}$ arylene group, or a substituted or unsubstituted $C_2$-$C_{20}$ heteroarylene group, and $Z_1$ is a hydrogen atom, Na, or K; and m and n are each a mole fraction of from 0.01 to 0.99.

The sulfonated polyarylene ether may be, for example, a polymer represented by Formula 9A below, Formula 9A

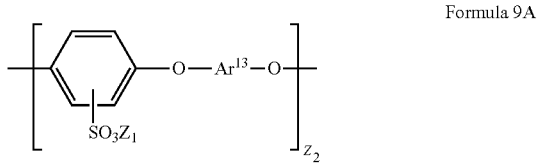

wherein in Formula 9A, $Ar^{13}$ is a substituted or unsubstituted $C_6$-$C_{20}$ arylene group, or a substituted or unsubstituted $C_2$-$C_{20}$ heteroarylene group, and $Z_1$ is a hydrogen atom, Na, or K; and $Z_2$ represents a degree of polymerization of from about 20 to about 600.

The sulfonated polyarylene ether or the sulfonated polyarylene ether sulfone may have a weight average molecular weight of about 1,000,000 or less, and in some embodiments, may have a weight average molecular weight of from about 300 to about 1,000,000.

The sulfonated polyarylene ether sulfone may be, for example, a compound represented by Formula 8 below, wherein:

Formula 9

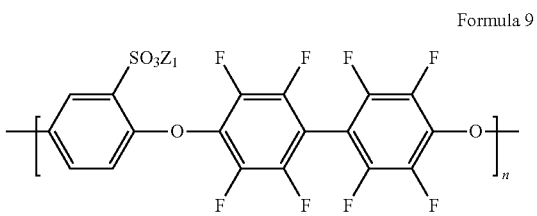

$Z_1$ is a hydrogen atom, Na, or K, and n is a degree of polymerization of from about 20 to about 600.

Hereinafter, a method of manufacturing the electrolyte membrane according to an embodiment of the present invention will be described.

First, a proton-conductive polymer and an organic solvent are mixed together to obtain a proton-conductive polymer solution.

Subsequently, pores of the porous membrane are impregnated with the proton-conductive polymer by using the proton-conductive polymer solution.

Physical properties of the proton-conductive polymer are inherently unsuitable to form a freestanding film, and thus its application has been limited. However, in the current embodiment, the proton-conductive polymer may form a film by being impregnated in the pores of the porous membrane serving as a support.

After the impregnation of the proton-conductive polymer into the pores of the porous membrane, a protonating process may be further performed. The protonating process allows a proton-conductive group to enter the electrolyte membrane, and thus improves proton conductivity of the electrolyte membrane. For example, when the proton-conductive polymer is one of the compounds of Formulae 8 and 9 where $Z_1$ is Na or K, the protonating process may be performed.

The protonating process refers to an acid treatment process using, for example, sulfuric acid. For example, the impregnated product may be immersed in an about 4-20 wt % aqueous sulfuric acid solution and treated at a temperature of about 30-100° C.

The concentration of the proton-conductive polymer in the proton-conductive polymer solution may be from about 5 parts by weight to about 15 parts by weights based on 100

Formula 8

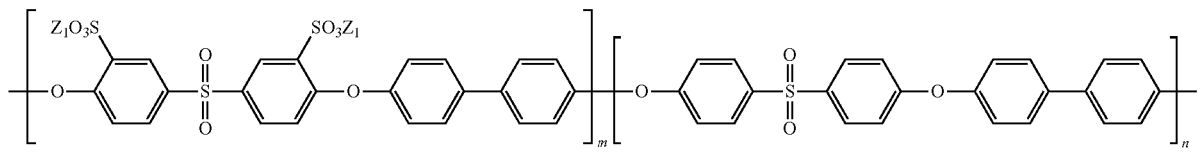

$Z_1$ is a hydrogen atom, Na, or K, and m and n are each a mole fraction of from 0.01 to 0.99. In some embodiments, m may be from 0.4 to 0.7; and n may be from 0.3 to 0.6.

The polymer of Formula 8 may have a degree of polymerization of from about 20 to about 600.

The sulfonated polyarylene ether may be, for example, a compound represented by Formula 9 (poly[5-methyl-2-(4'-methylbiphenyl-4-yloxy)benzenesulfonic acid] below, wherein:

parts by weight of the total weight of the proton-conductive polymer solution. When the concentration of the proton-conductive polymer is within this range, a sufficient amount of the proton-conductive polymer may be incorporated into the porous membrane.

The impregnation of the pores of the porous membrane with the proton-conductive polymer may be performed using any process known in the art, for example, dipping, spray coating, screen printing, coating using a doctor blade, or the like.

In an embodiment the impregnation of the pores of the porous membrane with the proton-conductive polymer may involve dipping the porous membrane in the proton-conductive polymer solution, drawing the porous membrane out of the proton-conductive polymer solution, and removing the organic solvent from the porous membrane.

The temperature of the proton-conductive polymer solution is not specifically limited, and may be from about 30° C. to about 80° C. When the impregnation is performed within this temperature, the impregnation ratio of the proton-conductive polymer to the porous membrane may be sufficiently high.

For example, the removing of the organic solvent may include thermal treatment on a hot plate at a temperature of from about 30° C. to about 80° C.

The electrolyte membrane manufactured according to the above processes may have a structure including the porous membrane with the proton-conductive polymer provided in the pores of the porous membrane. In the electrolyte membrane the material forming the porous membrane is bound to the proton-conductive polymer via a chemical bond.

The chemical bond may be an ionic bond or a hydrogen bond. In particular, when the polyazole-based material is PBI, N in the PBI forms a hydrogen bond with —O—H at a terminal of a sulfonic acid group (—SO$_3$H) when PAE is used as the proton-conductive polymer, as illustrated in Reaction Scheme 1 below.

Reaction Scheme 1

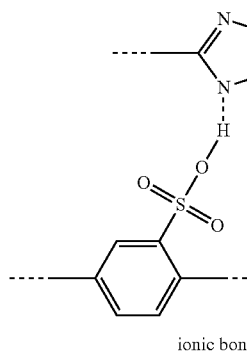

ionic bond

The electrolyte membrane manufactured according to the above processes may further include a coating layer on at least one surface of the porous membrane. The coating layer may be a layer coated with the proton-conductive polymer described above. The electrolyte membrane may have a thickness of from about 5 μm to about 50 μm. The coating layer may have a thickness of from about 5 μm to about 100 μm.

Hereinafter, the compounds represented by Formulae 1 to 6 above will be described in greater detail. Examples of the compound of Formula 1 include compounds represented by Formulae 13 to 61. Such compounds may be combined with a polyazole-based material as described below:

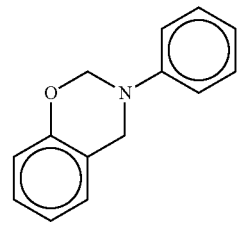

Formula 13

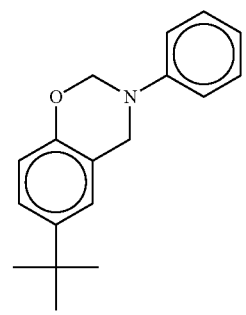

Formula 14

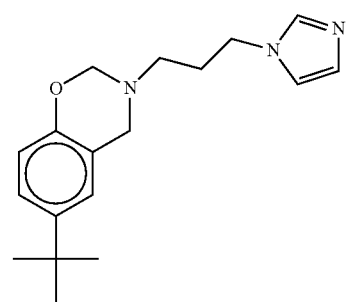

Formula 15

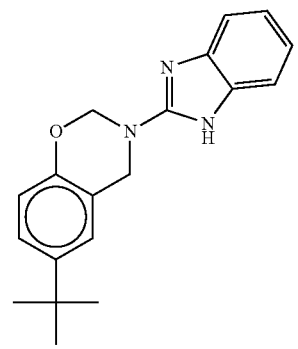

Formula 16

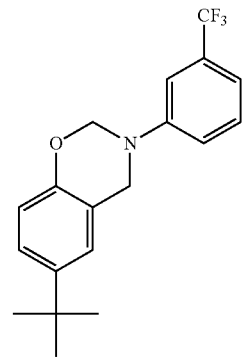

Formula 17

-continued
Formula 18
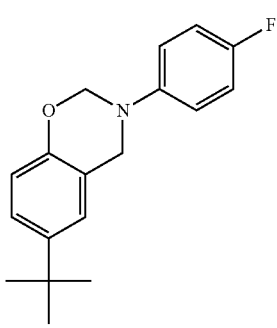
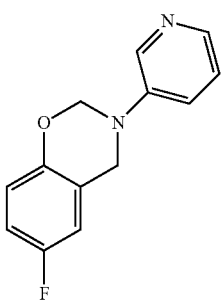
Formula 19
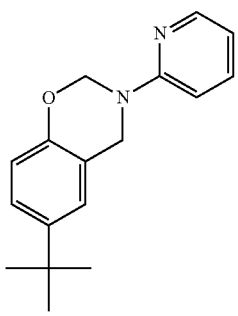
Formula 23
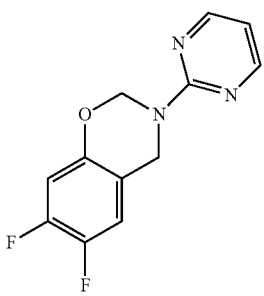
Formula 24
Formula 20
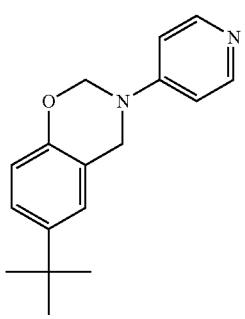
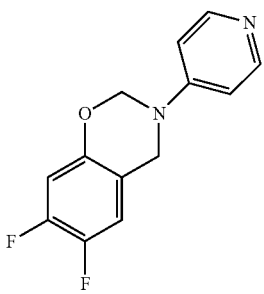
Formula 25
Formula 21
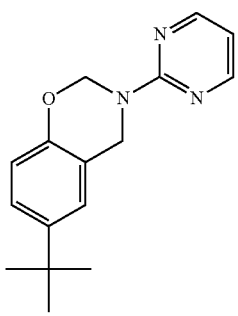
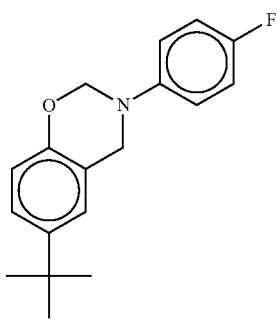
Formula 26
Formula 22
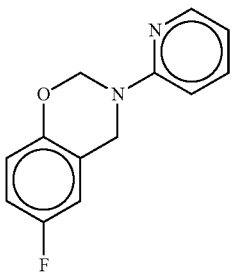
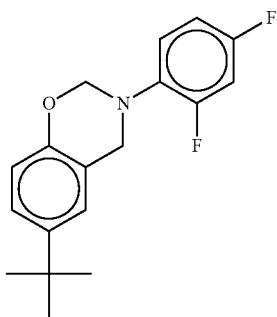
Formula 27

-continued
Formula 28
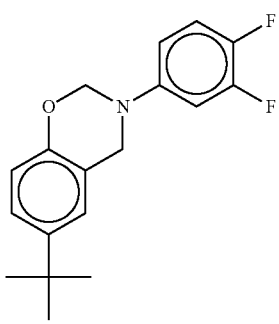
Formula 29
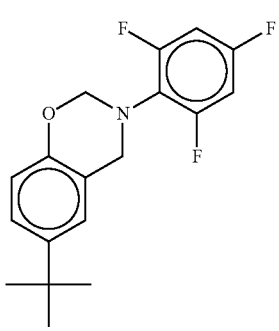
Formula 30
Formula 31
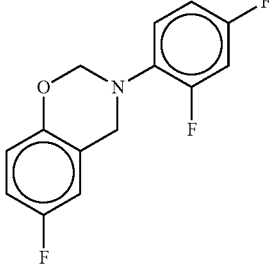
Formula 32
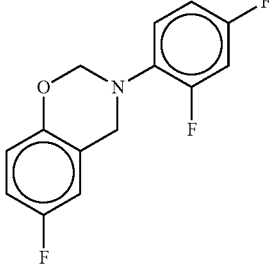
Formula 33
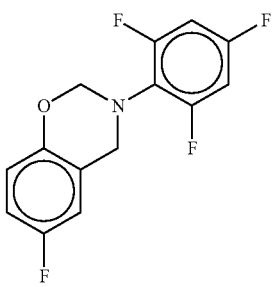
Formula 34
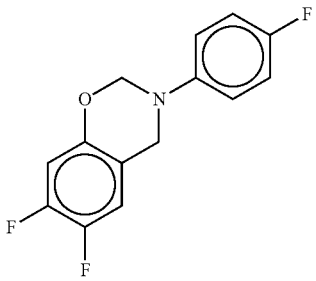
Formula 35
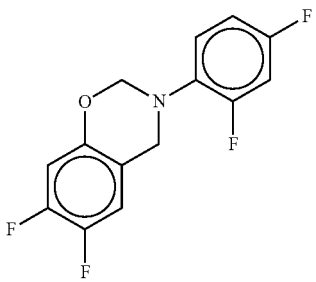
Formula 36
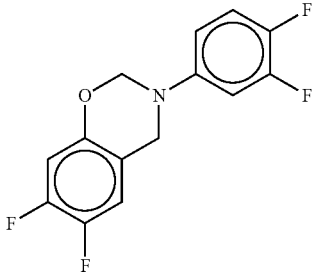
Formula 37
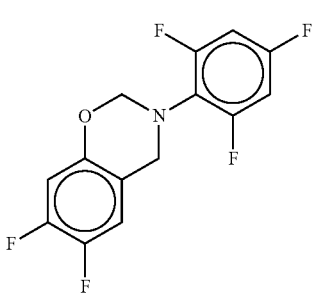

Formula 38
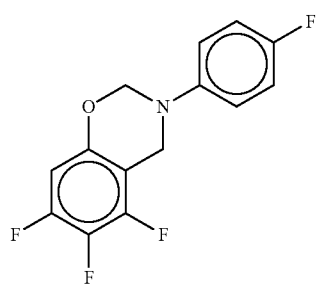
Formula 39
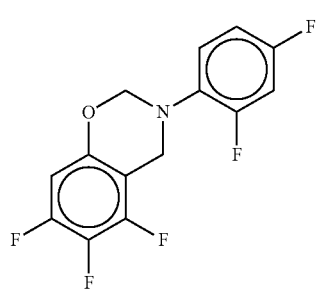
Formula 40
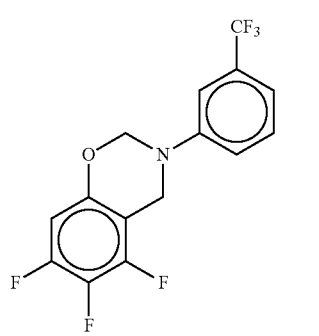
Formula 41
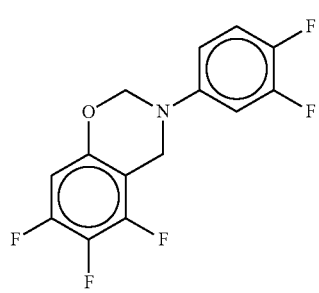
Formula 42
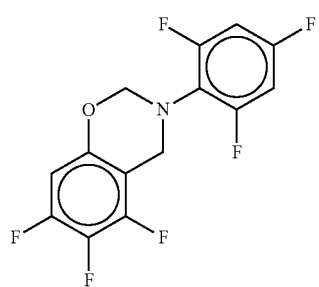
Formula 43
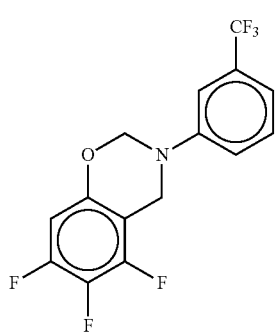
Formula 44
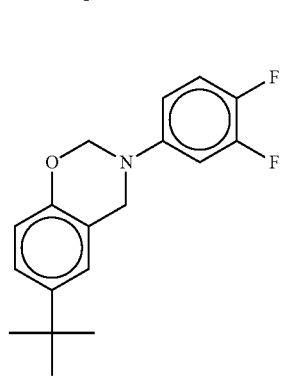
Formula 45
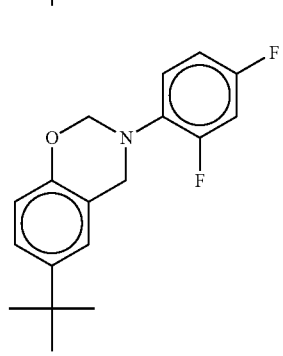
Formula 46
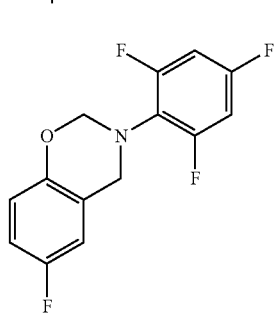
Formula 47
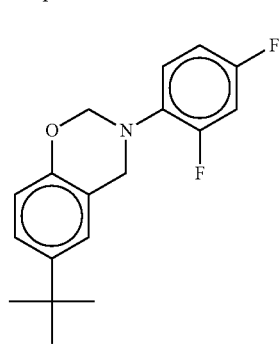

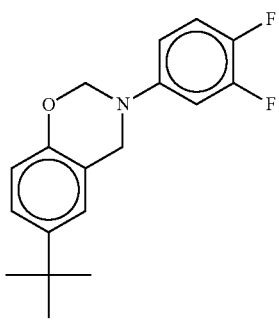
Formula 48
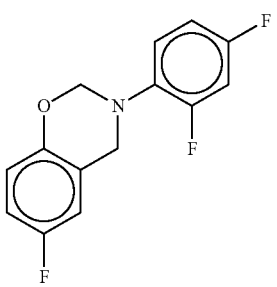
Formula 53
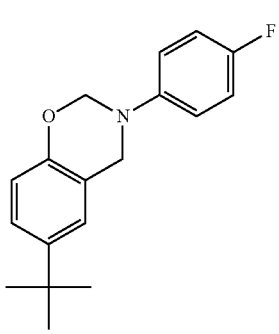
Formula 49
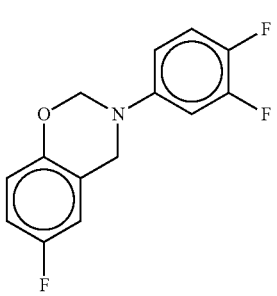
Formula 54
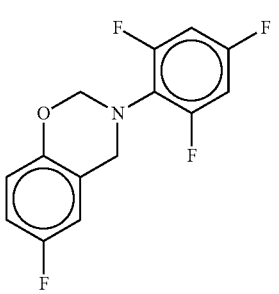
Formula 50
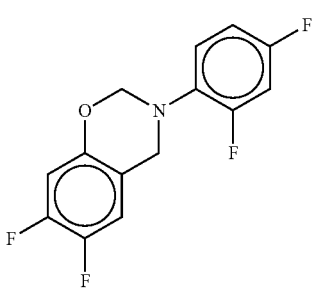
Formula 55
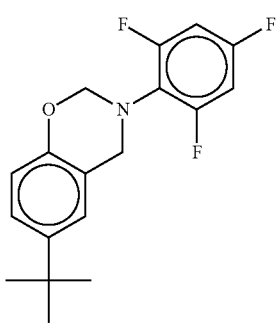
Formula 51
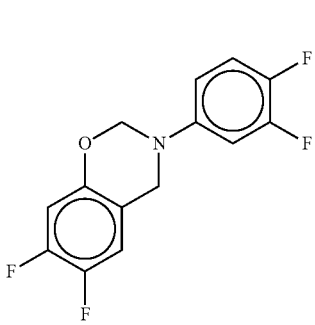
Formula 56
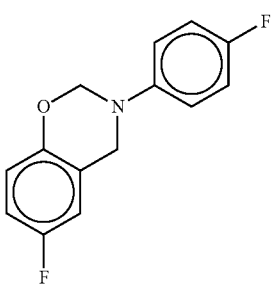
Formula 52
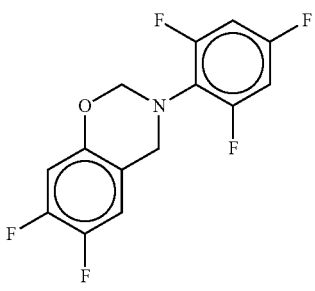
Formula 57

Formula 58
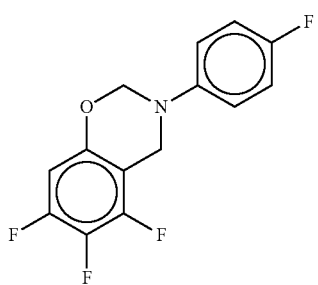
Formula 59
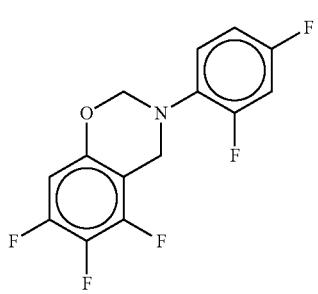
Formula 60
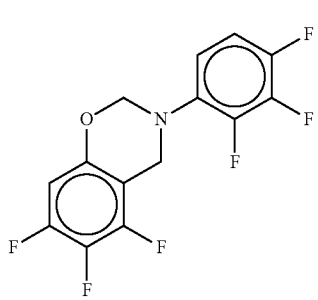
Formula 61
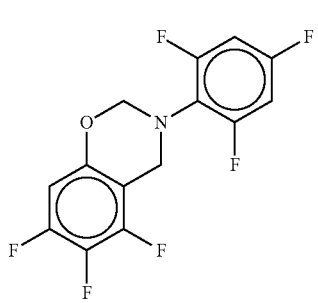
Examples of the compound of Formula 2 include compounds represented by Formulae 62 to 66.
Formula 62
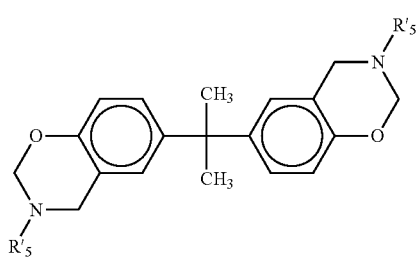
Formula 63
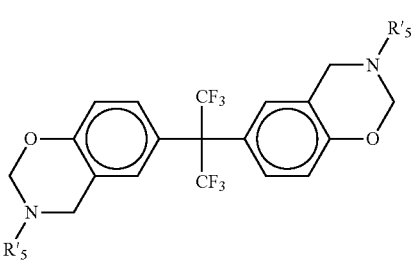
Formula 64
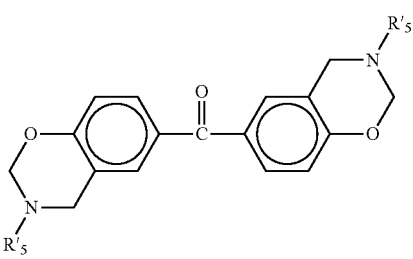
Formula 65
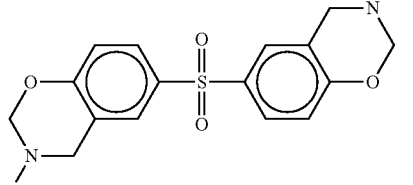
Formula 66
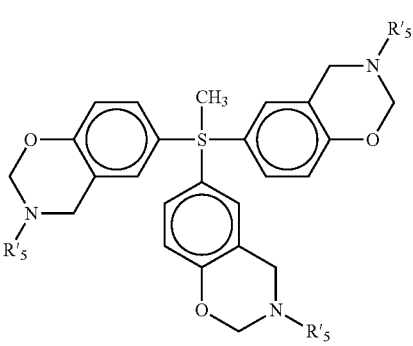
In Formulae 62 to 66, $R_{5'}$ is —$CH_2$—CH=$CH_2$ or a group represented by one of Formulae 66A.
Formula 66A
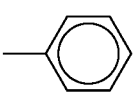 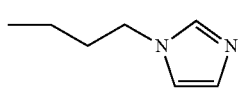
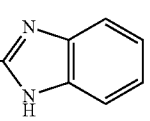 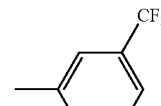
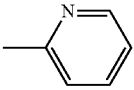 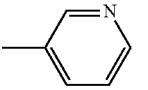

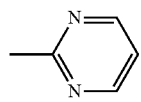
Examples of the compound of Formula 2 include compounds represented by Formulae 67 to 70.
Formula 67
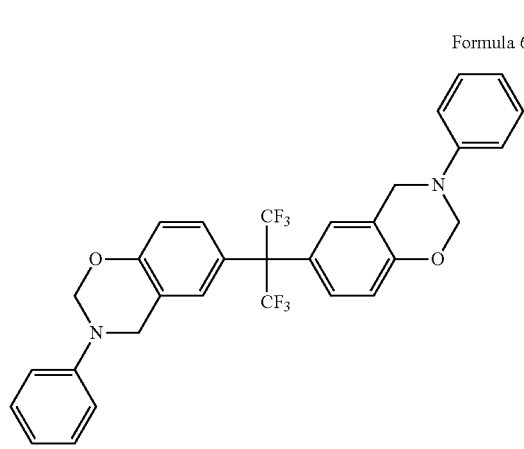
Formula 68
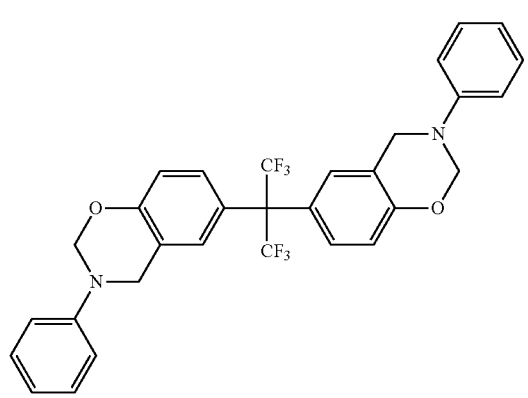
Formula 69
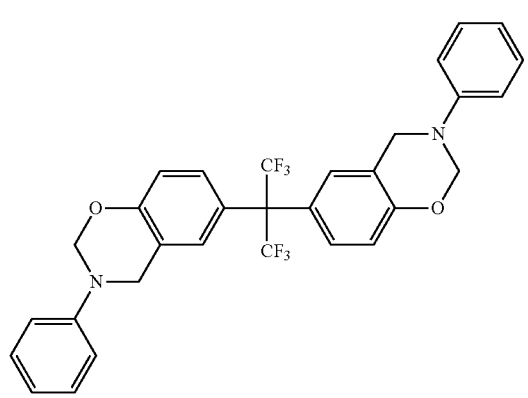
Formula 70
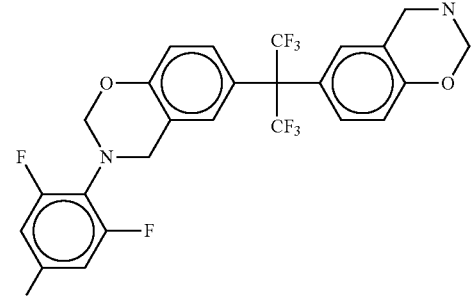
Examples of the compound of Formula 3 include compounds represented by Formulae 71 to 74 below:
Formula 71
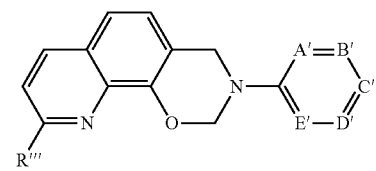
wherein in Formula 71, R''' is a hydrogen atom or a $C_1$-$C_{10}$ alkyl group.
Formula 72
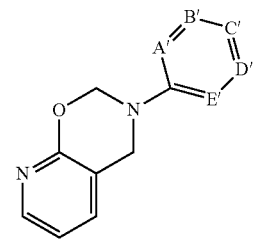
Formula 73
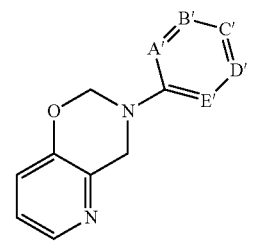

Formula 74
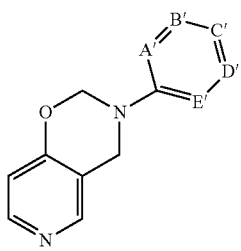
In Formulae 71 to 74,
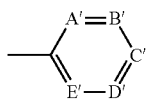
is selected from among groups presented by Formulae 74A below.
Formulae 74A
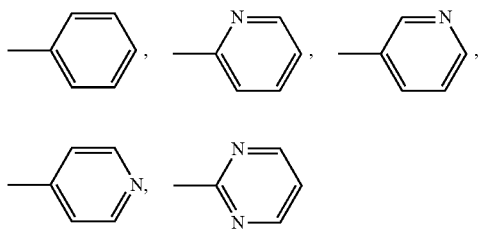
Examples of the compound of Formula 3 include compounds represented by Formulae 75 to 95 below:
Formula 75
Formula 76
Formula 77
Formula 78
Formula 79
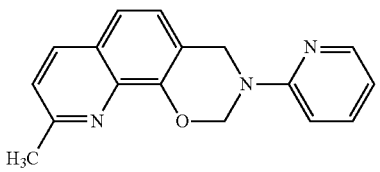
Formula 80
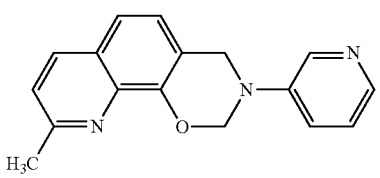
Formula 81
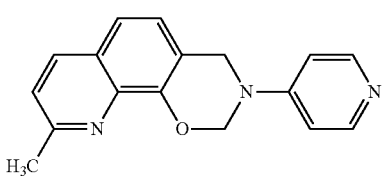
Formula 82
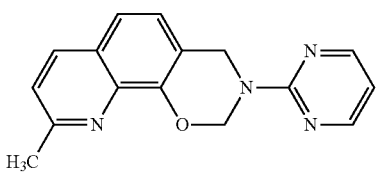
Formula 83
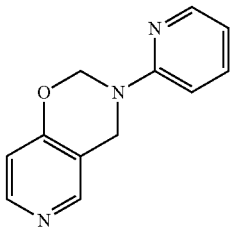
Formula 84
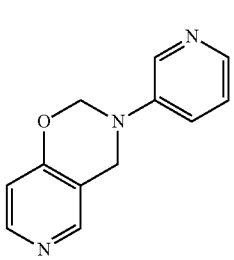
Formula 85
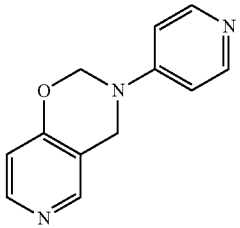

-continued

Formula 86
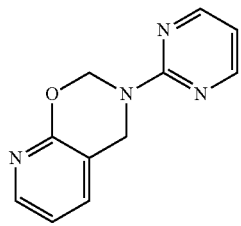

Formula 87
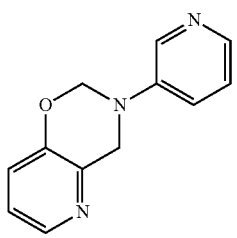

Formula 88
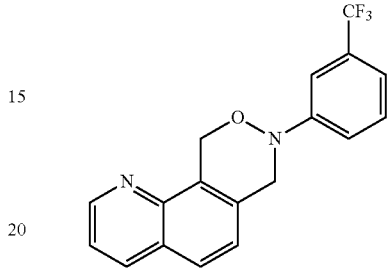

Formula 89
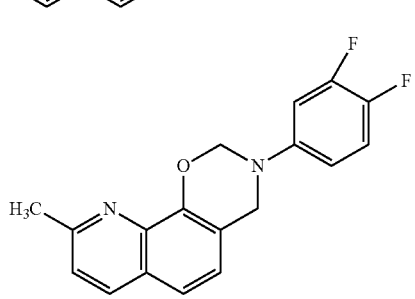

Formula 90
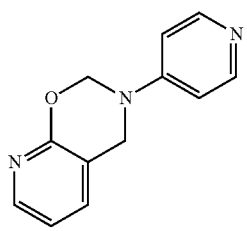

Formula 91
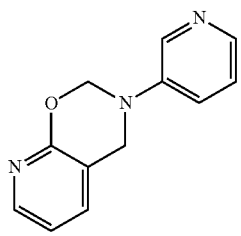

Formula 92
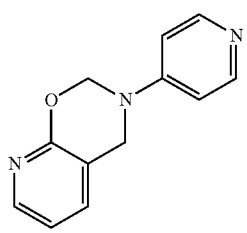

-continued

Formula 93
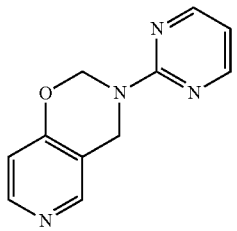

Formula 94
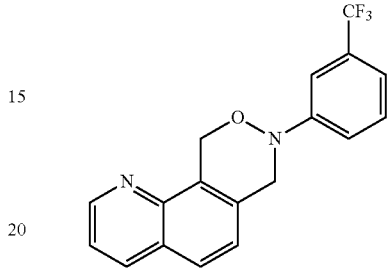

Formula 95
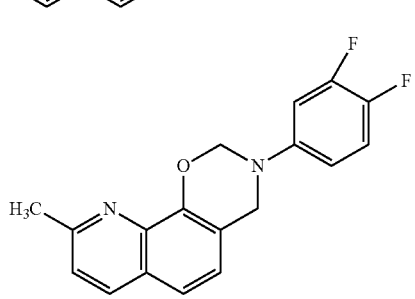

In the compound of Formula 4, A' may be a group represented by Formulae 96 or 97 below:

Formula 96
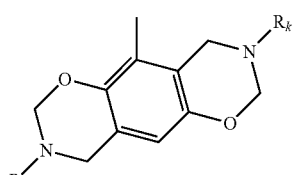

Formula 97
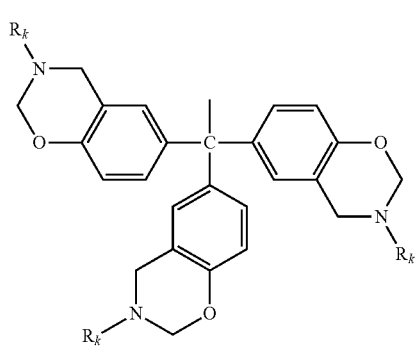

wherein in Formulae 96 and 97, $R_k$ is a hydrogen atom, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbon ring group, a halogenated $C_4$-$C_{20}$ carbon ring group, a $C_1$-$C_{20}$ heterocyclic group or a halogenated $C_1$-$C_{20}$ heterocyclic group.

Examples of the compound of Formula 4 include compounds represented by Formulae 98 and 99 below:

Formula 98

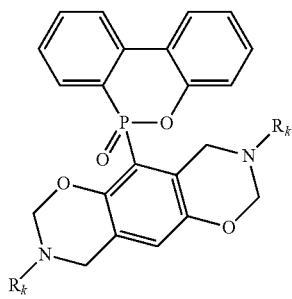

Formula 99

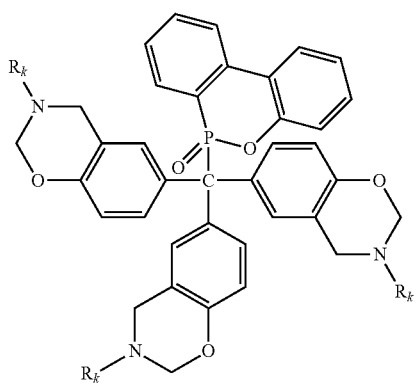

In Formula 98 and 99, $R_k$ is selected from among groups represented by Formula 99A below:

Formula 99A

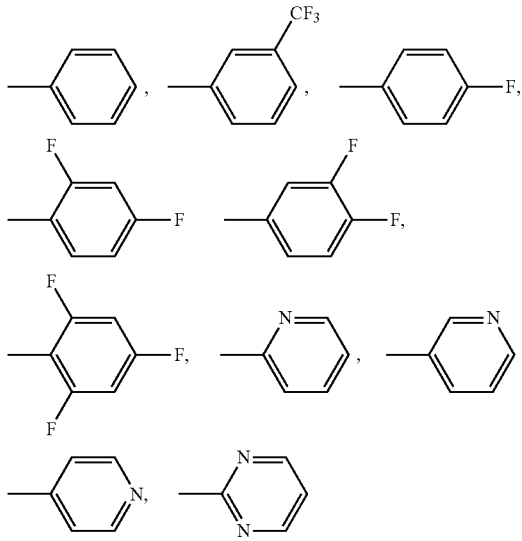

Examples of the compound of Formula 4 include compounds represented by Formulae 100 to 105 below:

Formula 100

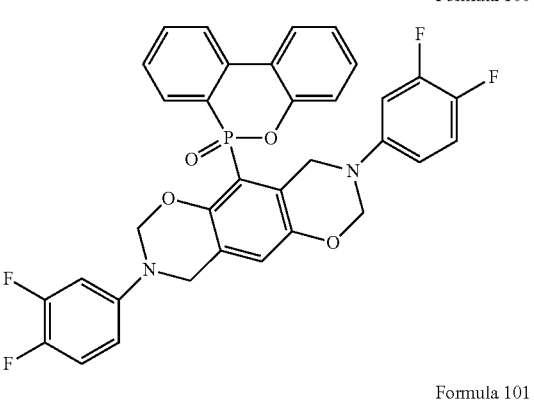

Formula 101

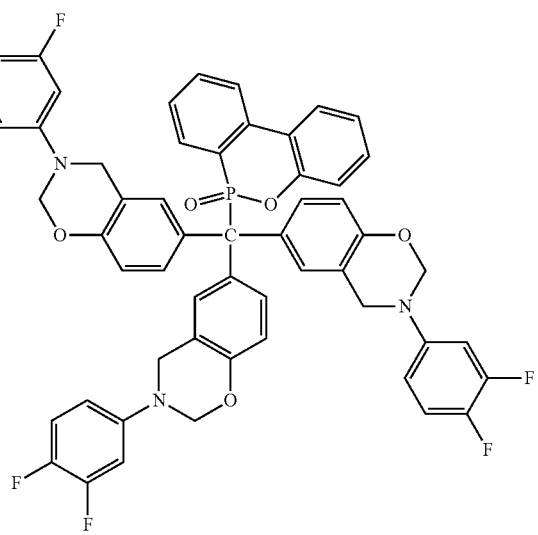

Formula 102

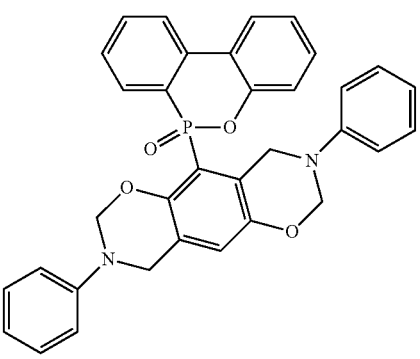

Formula 103

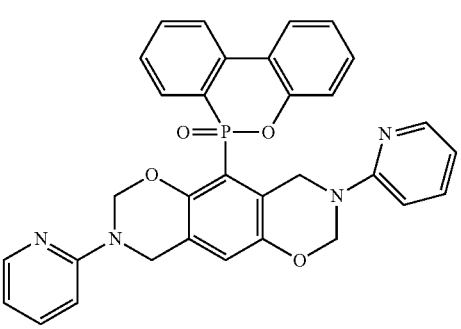

Formula 104

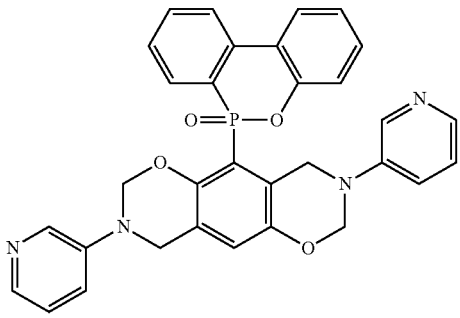

Formula 105

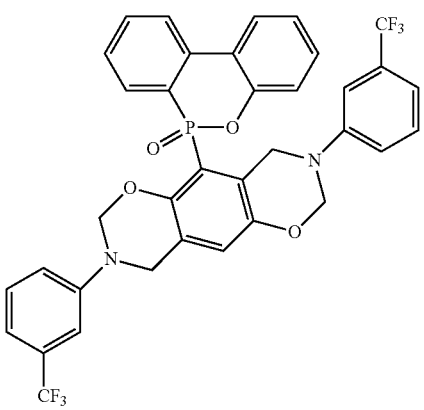

Examples of the compound of Formula 5 include compounds represented by Formulae 106, 107, and 109 below:

Formula 106

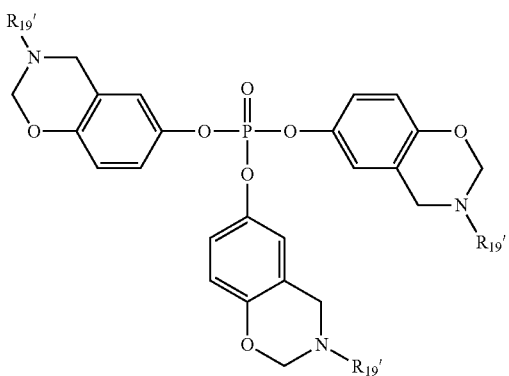

Formula 107

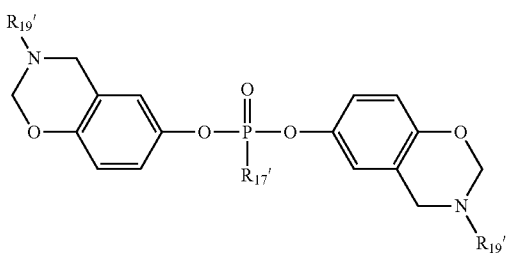

wherein in Formulae 106 and 107, $R_{17}'$ is a $C_1$-$C_{10}$ alkyl group, a $C_1$-$C_{10}$ alkoxy group, a $C_6$-$C_{10}$ aryl group or a $C_6$-$C_{10}$ aryloxy group, and $R_{19}'$ is selected from among groups represented by Formula 108 below:

Formula 108

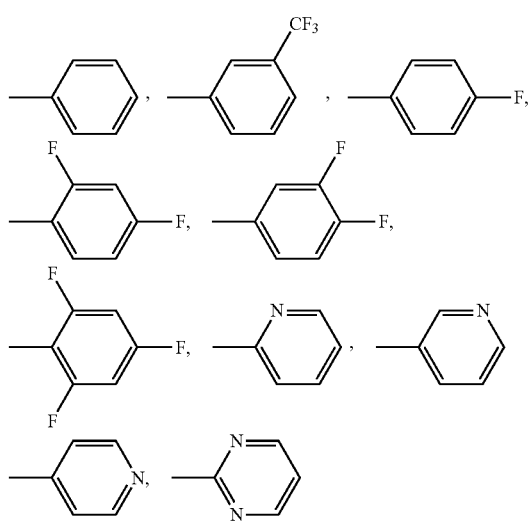

Formula 109

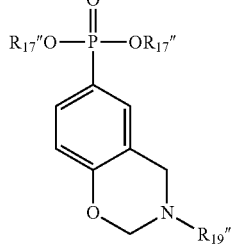

wherein in Formula 109, $R_{17}''$ is a $C_6$-$C_{10}$ aryl group, and $R_{19}''$ is selected from groups represented by Formula 110 below:

Formula 110

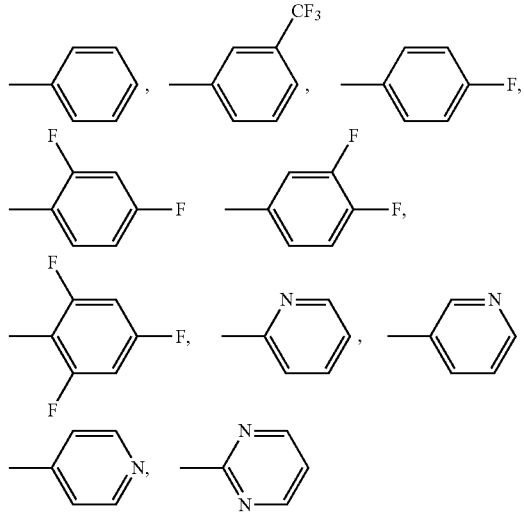

Examples of the compound of Formula 5 include compounds represented by Formulae 111 and 112.

Formula 111
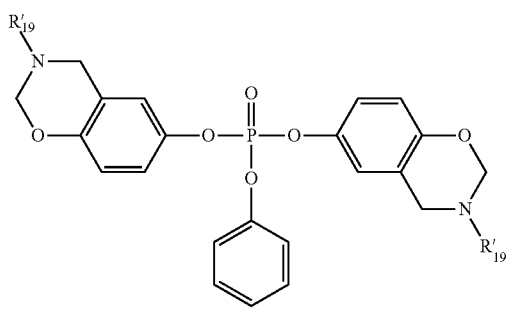
Formula 113
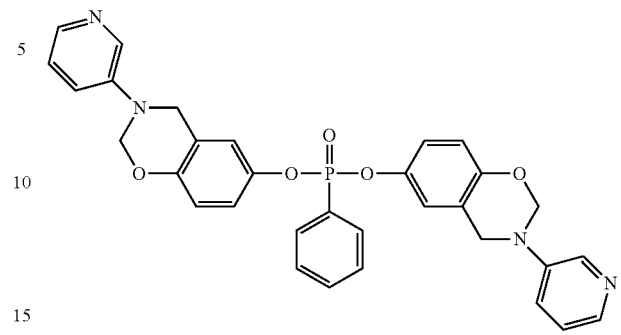
Formula 112
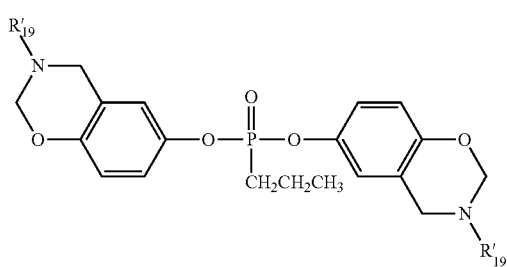
Formula 114
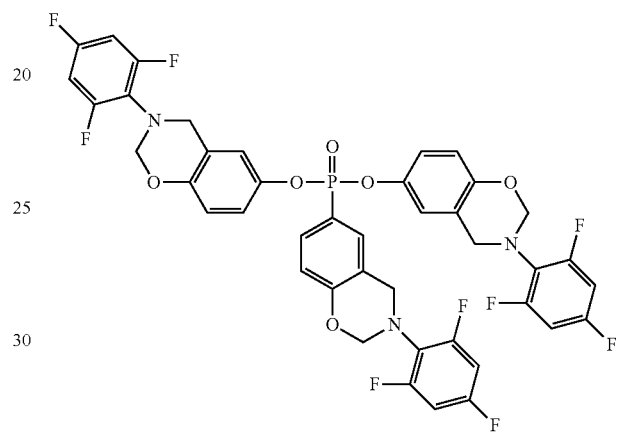
Wherein in Formulae 111 and 112, $R_{19}'$ is selected from among groups represented by Formulae 111A below:
Formula 111A
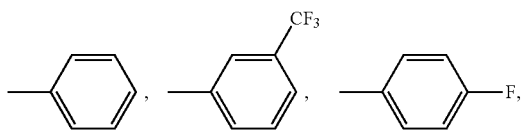
Formula 115
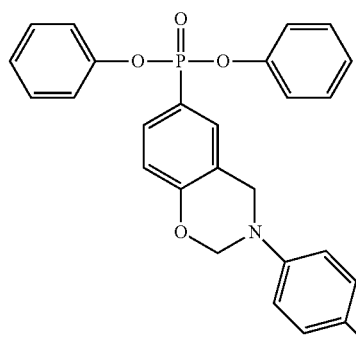
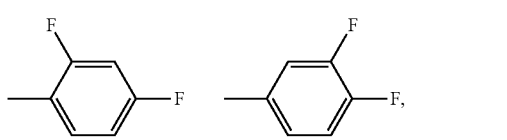
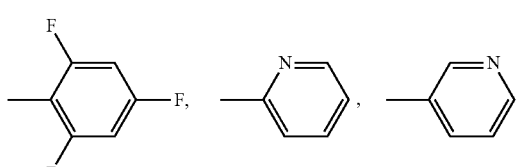
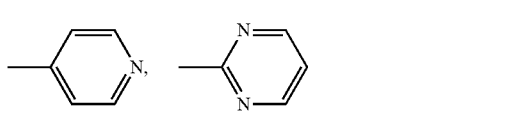
Examples of the compound of Formula 5 include compounds represented by Formulae 113 to 117 and Formulae 117A and 118:
Formula 116
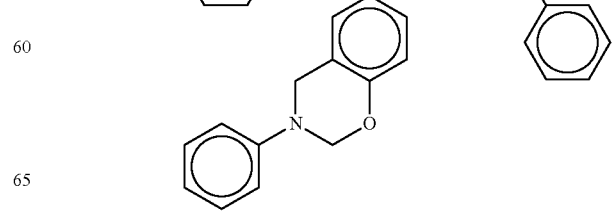

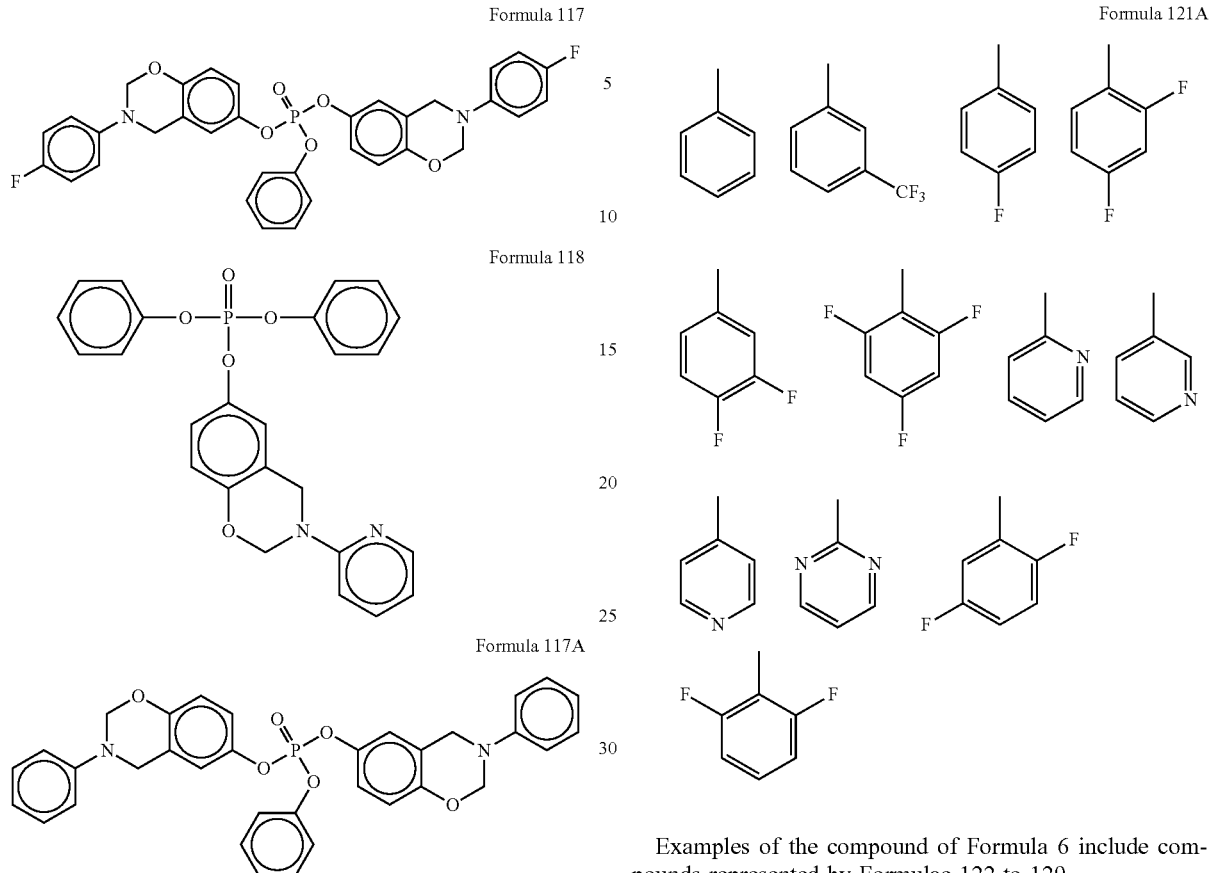
Examples of the compound of Formula 6 include compounds represented by Formulae 122 to 129.
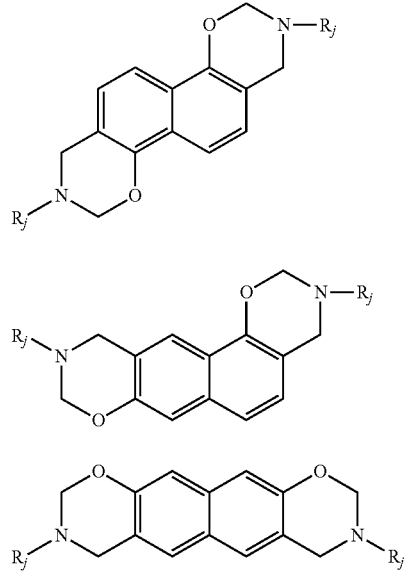
Examples of the compound of Formula 6 include compounds represented by Formulae 119 to 121,
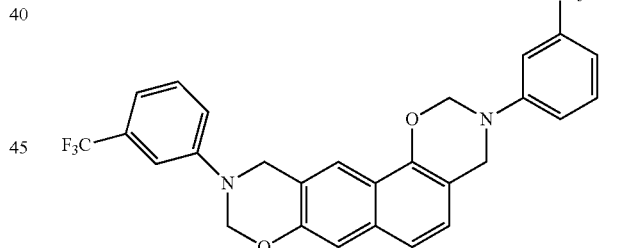
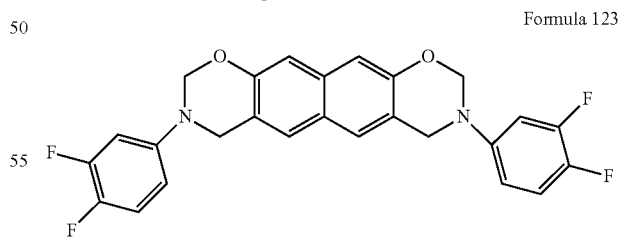
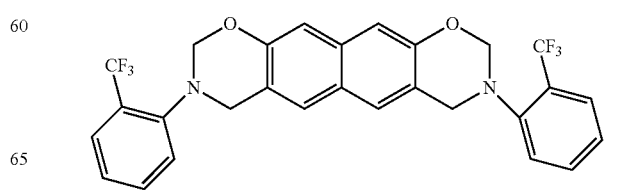
wherein in Formulae 119 to 121, $R_j$ is selected from among groups represented by Formula 121A below:

-continued

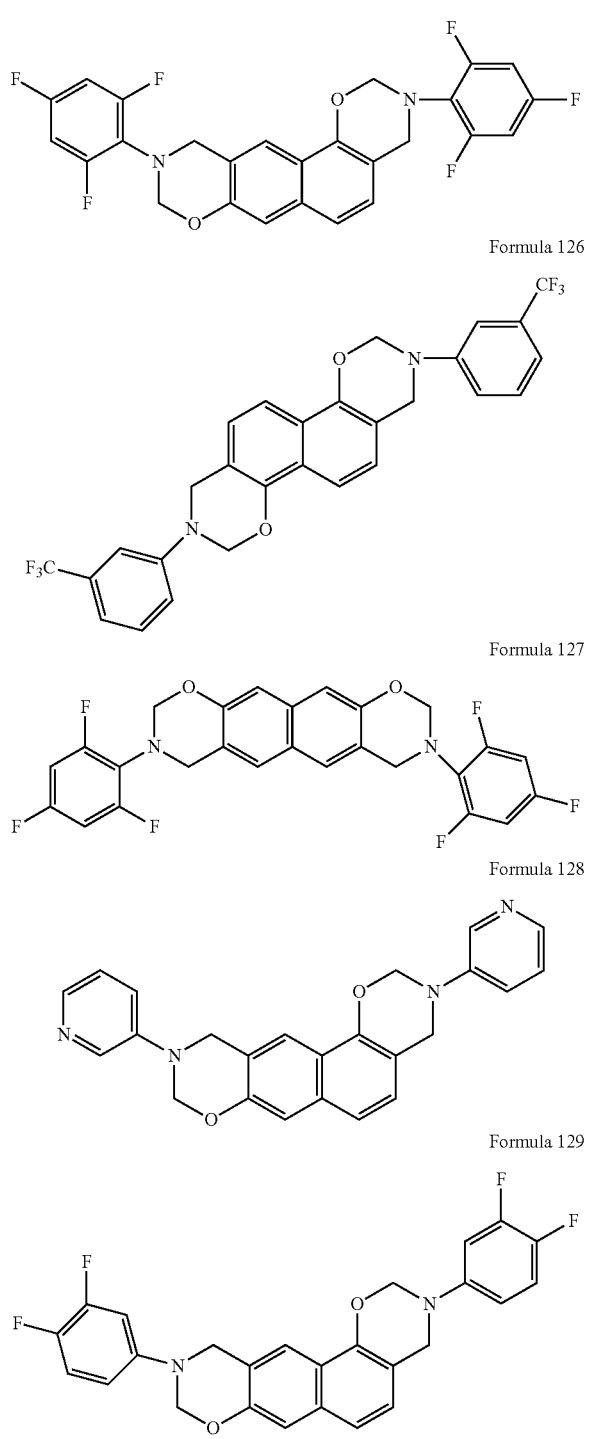

Formula 125

Formula 126

Formula 127

Formula 128

Formula 129

Hereinafter, the polyazole-based material that reacts with at least one of the compounds of Formulae 1 to 6 will be described in greater detail. The polyazole-based material refers to a polymer, a repeating unit of which includes at least one aryl ring having at least one nitrogen atom.

The aryl ring may be a five-membered or six-membered atom ring with one to three nitrogen atoms that may be fused to another ring, for example, another aryl ring or heteroaryl ring. In this regard, the nitrogen atoms may be substituted with oxygen, phosphorous and/or sulfur atom. Examples of the aryl ring include phenyl, naphthyl, hexahydroindyl, indanyl, tetrahydronaphthyl, and the like.

The polyazole-based material may have at least one amino group in the repeating unit as described above. In this regard, the at least one amino group may be a primary, secondary or tertiary amino group which are either part of the aryl ring or part of a substituent of the aryl ring.

The term "amino group" indicates a group with a nitrogen atom covalently bonded to at least one carbon or hetero atom. The amino group may refer to, for example, —$NH_2$ and substituted moieties.

The term "amino group" also refers to an "alkylamino group" with nitrogen bound to at least one additional alkyl group, and "arylamino" and "diarylamino" groups with at least one or two nitrogen atoms bound to a selected aryl group.

Methods of preparing the polyazole-based material and a polymer film including the polyazole-based material are disclosed in US 2005/256296A.

In some embodiments, examples of the polyazole-based material include polyazole-based materials represented by Formulae 130 to 143.

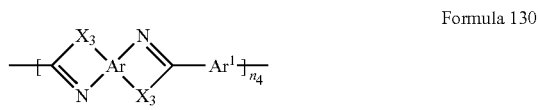

Formula 130

Formula 131

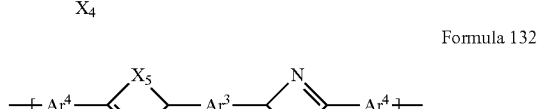

Formula 132

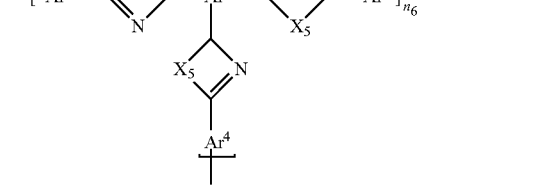

Formula 133

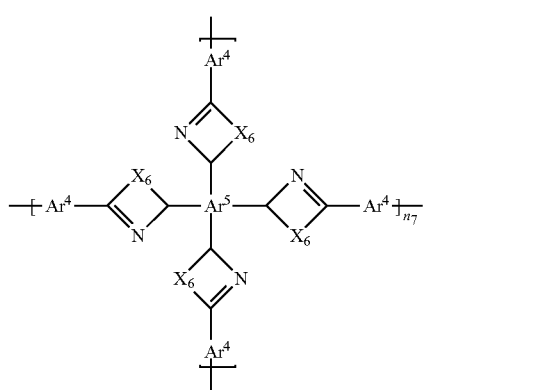

Formula 134

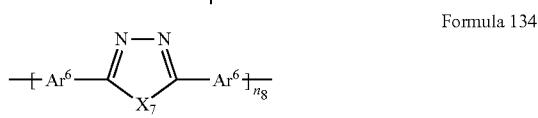

Formula 135

-continued

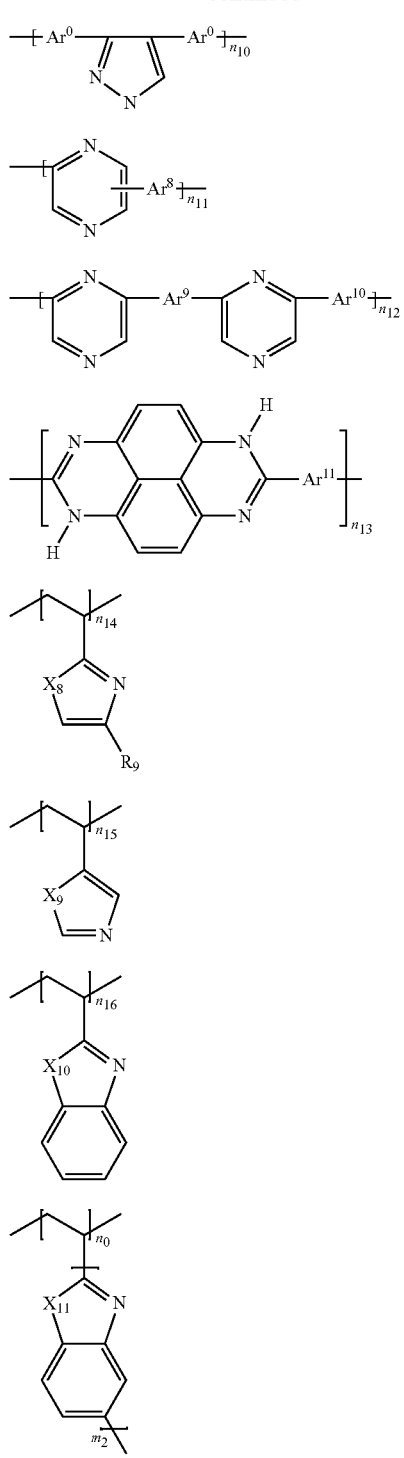

Formula 136

Formula 137

Formula 138

Formula 139

Formula 140

Formula 141

Formula 142

Formula 143 wherein in Formulae 130 to 143, $Ar^o$ may be identical to or different from another $Ar^o$, or any other $Ar^n$ (where n can be no superscript or 1 to 11), and may be a bivalent monocyclic or polycyclic $C_6$-$C_{20}$ aryl group or a $C_2$-$C_{20}$ heteroaryl group;

Ar may be identical to or different from another Ar, or any other $Ar^n$ (where n can be no superscript or 1 to 11), and may be a tetravalent monocyclic or polycyclic $C_6$-$C_{20}$ aryl group or a $C_2$-$C_{20}$ heteroaryl group;

$Ar^1$ may be identical to or different from another $Ar^1$, or any other $Ar^n$ (where n can be no superscript or 1 to 11), and may be a bivalent monocyclic or polycyclic $C_6$-$C_{20}$ aryl group or a $C_2$-$C_{20}$ heteroaryl group;

$Ar^2$ may be identical to or different from another $Ar^2$ or any other $Ar^n$ (where n can be no superscript or 1 to 11), and may be a bivalent or trivalent monocyclic or polycyclic $C_6$-$C_{20}$ aryl group or a $C_2$-$C_{20}$ heteroaryl group;

$Ar^3$ may be identical to or different from another $Ar^3$, or any other $Ar^n$ (where n can be no superscript or 1 to 11), and may be a trivalent monocyclic or polycyclic $C_6$-$C_{20}$ aryl group or a $C_2$-$C_{20}$ heteroaryl group;

$Ar^4$ may be identical to or different from another $Ar^4$, or any other $Ar^n$ (where n can be no superscript or 1 to 11), and may be a trivalent monocyclic or polycyclic $C_6$-$C_{20}$ aryl group or a $C_2$-$C_{20}$ heteroaryl group;

$Ar^5$ may be identical to or different from another $Ar^5$, or any other $Ar^n$ (where n can be no superscript or 1 to 11), and may be a tetravalent monocyclic or polycyclic $C_6$-$C_{20}$ aryl group or a $C_2$-$C_{20}$ heteroaryl group;

$Ar^6$ may be identical to or different from another $Ar^6$ or any other $Ar^n$ (where n can be no superscript or 1 to 11), and may be a bivalent monocyclic or polycyclic $C_6$-$C_{20}$ aryl group or a $C_2$-$C_{20}$ heteroaryl group;

$Ar^7$ may be identical to or different from another $Ar^7$, or any other $Ar^n$ (where n can be no superscript or 1 to 11), and may be a bivalent monocyclic or polycyclic $C_6$-$C_{20}$ aryl group or a $C_2$-$C_{20}$ heteroaryl group;

$Ar^8$ may be identical to or different from another $Ar^8$, or any other $Ar^n$ (where n can be no superscript or 1 to 11), and may be a trivalent monocyclic or polycyclic $C_6$-$C_{20}$ aryl group or a $C_2$-$C_{20}$ heteroaryl group;

$Ar^9$ may be identical to or different from another $Ar^9$ or any other $Ar^n$ (where n can be no superscript or 1 to 11), and may be a bivalent, trivalent or tetravalent monocyclic or polycyclic $C_6$-$C_{20}$ aryl group or a $C_2$-$C_{20}$ heteroaryl group;

$Ar^{10}$ may be identical to or different from another $Ar^{10}$, or any other $Ar^n$ (where n can be no superscript or 1 to 11), and may be a bivalent or trivalent monocyclic or polycyclic $C_6$-$C_{20}$ aryl group or a $C_2$-$C_{20}$ heteroaryl group;

$Ar^{11}$ may be identical to or different from another $Ar^{11}$, or any other $Ar^n$ (where n can be no superscript or 1 to 11), and may be a bivalent monocyclic or polycyclic $C_6$-$C_{20}$ aryl group or a $C_2$-$C_{20}$ heteroaryl group;

$X_3$ to $X_{11}$ may be identical to or different from each other, and may be an oxygen atom, a sulfur atom or —N(R'); and R' may be a hydrogen atom, a $C_1$-$C_{20}$ alkyl group, a $C_1$-$C_{20}$ alkoxy group or a $C_6$-$C_{20}$ aryl group;

$R_9$ may be identical to or different from each other, and may be a hydrogen atom, a $C_1$-$C_{20}$ alkyl group or a $C_6$-$C_{20}$ aryl group; and $n_0$, $n_4$ to $n_{16}$, and $m_2$ may be each independently an integer of 10 or greater, and in some embodiments, may be each an integer of 100 or greater, and in some other embodiments, may be each an integer of 100 to 100,000.

Examples of the aryl or heteroaryl group include benzene, naphthalene, biphenyl, diphenylether, diphenylmethane, diphenyldimethylmethane, bisphenone, diphenylsulfone, quinoline, pyridine, bipyridine, pyridazine, pyrimidine, pyrazine, triazine, tetrazine, pyrrole, pyrazole, anthracene, benzopyrrole, benzotriazole, benzoxathiazole, benzoxadiazole, benzopyridine, benzopyrazine, benzopyrazidine, benzopyrimidine, benzotriazine, indolizine, quinolizine, pyridopyridine, imidazopyrimidine, pyrazinopyrimidine, carbazole, aziridine, phenazine, benzoquinoline, phenoxazine, phenothiazine, benzopteridine, phenanthroline and phenanthrene, wherein these aryl or heteroaryl groups may have a substituent.

$Ar^1$, $Ar^4$, $Ar^6$, $Ar^7$, $Ar^8$, $Ar^9$, $Ar^{10}$, and $Ar^{11}$ defined above may have any substitutable pattern. For example, if $Ar^1$, $Ar^4$, $Ar^6$, $Ar^7$, $Ar^8$, $Ar^9$, $Ar^{10}$, and $Ar^{11}$ are phenylene, $Ar^1$, $Ar^4$, $Ar^6$, $Ar^7$, $Ar^8$, $Ar^9$, $Ar^{10}$ and $Ar^{11}$ may be ortho-phenylene, meta-phenylene or para-phenylene.

The alkyl group may be a $C_1$-$C_4$ short-chain alkyl group, such as methyl, ethyl, n-propyl, i-propyl or t-butyl. The aryl group may be, for example, a phenyl group or a naphthyl group.

Examples of the substituent include a halogen atom, such as fluorine, an amino group, a hydroxyl group, and a short-chain alkyl group, such as methyl or ethyl.

Examples of the polyazole-based material include polyimidazole, polybenzothiazole, polybenzoxazole, polyoxadiazole, polyquinoxaline, polythiadiazole, polypyridine, polypyrimidine, and polytetrazapyrene.

The polyazole-based material may include a copolymer or blend including at least two units selected from the group consisting of units represented by Formulae 130 to 143 above. The polyazole-based material may include a block copolymer (di-block or tri-block), a random copolymer, aperiodic copolymer or an alternating polymer including at least two units selected from the units of Formulae 130 to 143. In some embodiments, the polyazole-based material may be a polymer including at least one of the units represented by Formulae 130 and 131.

Examples of the polyazole-based material include polymers represented by Formulae 144 to 170 below:

Formula 144

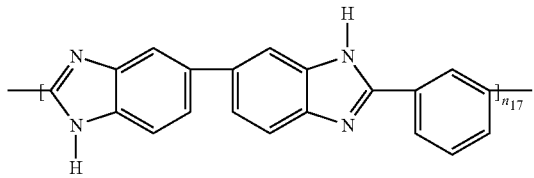

Formula 145

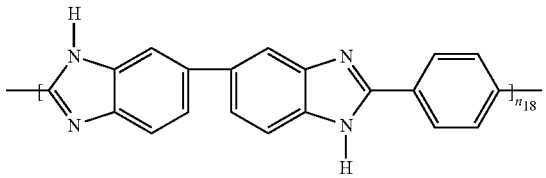

Formula 146

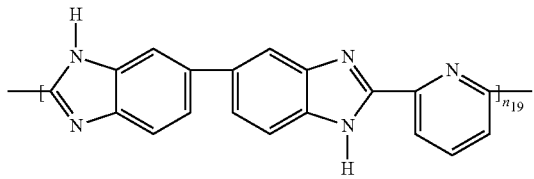

Formula 147

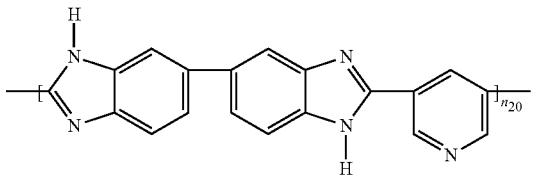

Formula 148

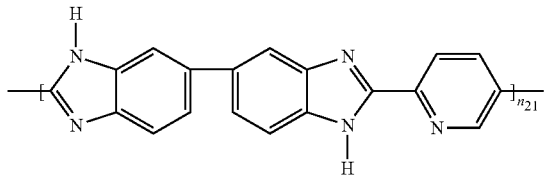

Formula 149

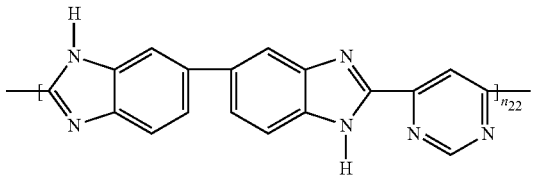

Formula 150

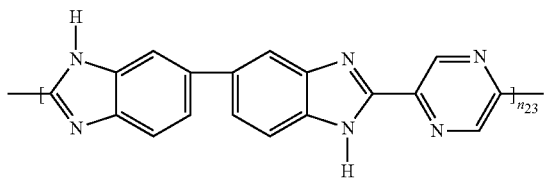

Formula 151

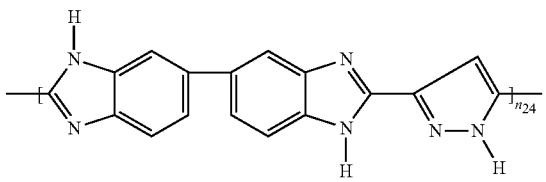

Formula 152

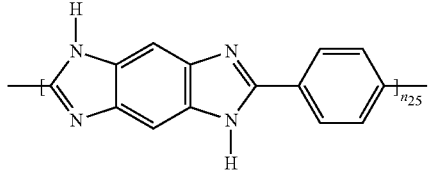

Formula 153

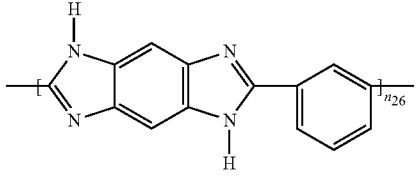

Formula 154

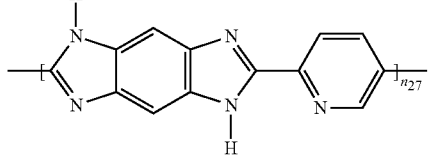

Formula 155

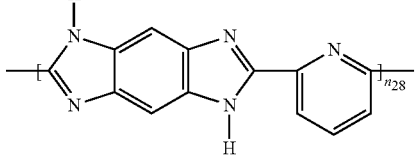

-continued
Formula 156
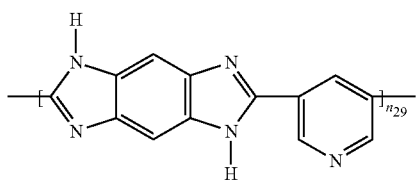
Formula 157
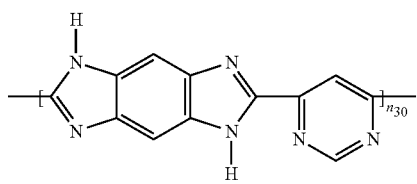
Formula 158
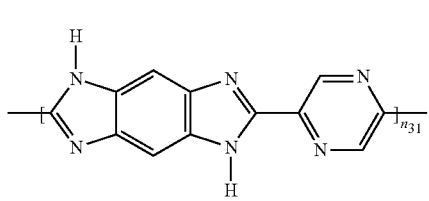
Formula 159
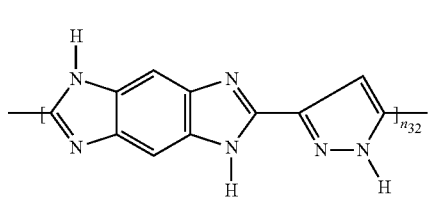
Formula 160
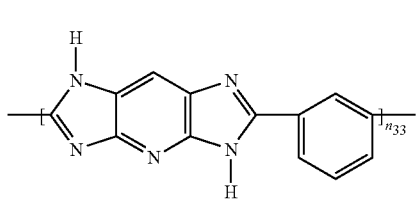
Formula 161
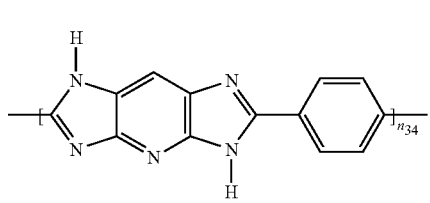
Formula 162
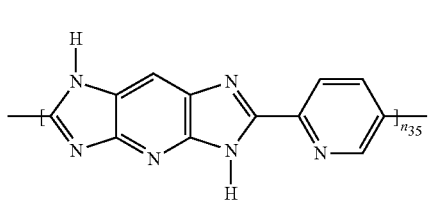
Formula 163
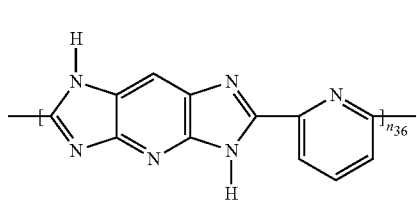
Formula 164
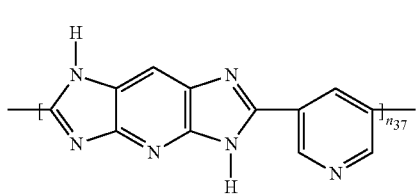
Formula 165
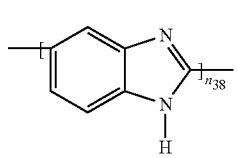
Formula 166
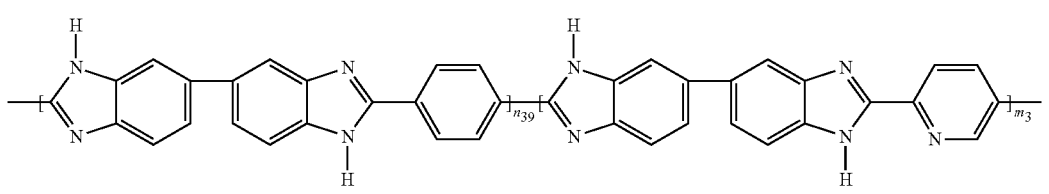
Formula 167
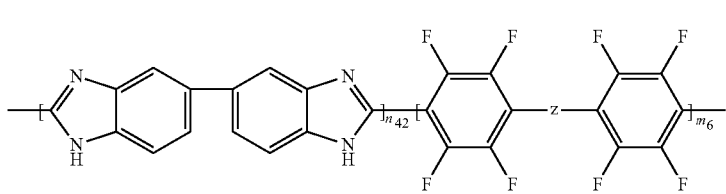
Formula 168
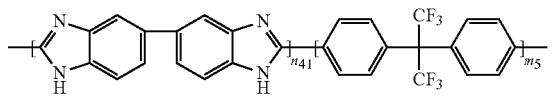
Formula 169

-continued

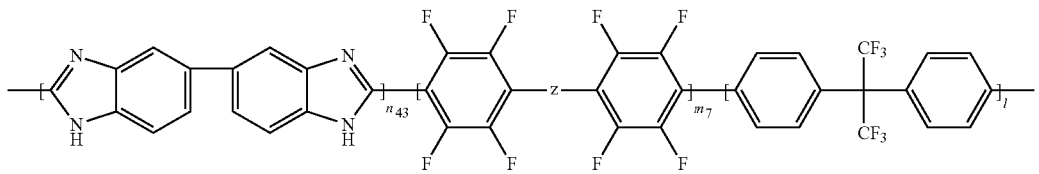
Formula 170 wherein in Formulae 144 to 170, I, $n_{17}$ to $n_{43}$, and $m_3$ to $m_7$ may be each an integer of 10 or greater, and in some embodiments, may be an integer of 100 or greater, z may be a chemical bond, $-(CH_2)_s-$, $-C(=O)-$, $-SO_2-$, $-C(CH_3)_2-$, or $-C(CF_3)_2-$; and s may be an integer from 1 to 5.

The polyazole-based material may include a compound including m-polybenzimidazole (PBI) represented by Formula 10 (poly[2,2'-(m-phenylene)-5,5'-bibenzimidazole]) below, or a compound including p-PBI represented by Formula 11 below. The polyazole-based material may be combined with Formulae 1 to 6 as described above.

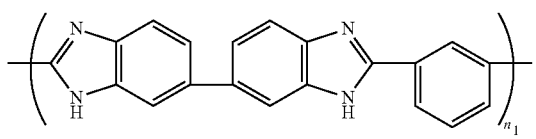
Formula 10 wherein in Formula 10, $n_1$ is an integer of 10 or greater;

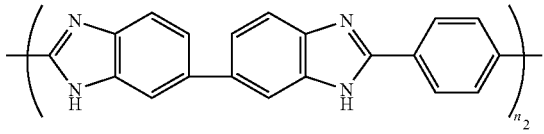
Formula 11 wherein in Formula 11, $n_2$ is an integer of 10 or greater, and in Formulae 10 and 11, $n_1$ and $n_2$ may be each an integer of, for example, 100 or greater.

The polymers of Formulae 10 and 11 may each have a number average molecular weight of 309 or greater, and in some embodiments, have a number average molecular weight of from about 3,090 to about 1,000,000.

The polyazole-based material may be a benzimidazole-based polymer represented by Formula 12 below, wherein in Formula 12, $R_{26}$ and $R_{27}$ are each independently a hydrogen atom, an unsubstituted or substituted $C_1$-$C_{20}$ alkyl group, an unsubstituted or substituted $C_1$-$C_{20}$ alkoxy group, an unsubstituted or substituted $C_6$-$C_{20}$ aryl group, an unsubstituted or substituted $C_6$-$C_{20}$ aryloxy group, an unsubstituted or substituted $C_3$-$C_{20}$ heteroaryl group, or an unsubstituted or substituted $C_3$-$C_{20}$ heteroaryloxy group, wherein $R_{26}$ and $R_{27}$ may be linked to form a $C_4$-$C_{20}$ carbon ring or a $C_3$-$C_{20}$ hetero ring;

$Ar^{12}$ is a substituted or unsubstituted $C_6$-$C_{20}$ arylene group or a substituted or unsubstituted $C_3$-$C_{20}$ heteroarylene group;

$R_{28}$ to $R_{30}$ are each independently a single or a multi-substituted substituent selected from the group consisting of a hydrogen atom, a substituted or unsubstituted $C_1$-$C_{20}$ alkyl group, a substituted or unsubstituted $C_1$-$C_{20}$ alkoxy group, a substituted or unsubstituted $C_6$-$C_{20}$ aryl group, a substituted or unsubstituted $C_6$-$C_{20}$ aryloxy group, a substituted or unsubstituted $C_6$-$C_{20}$ heteroaryl group, and a substituted or unsubstituted $C_3$-$C_{20}$ heteroaryloxy group;

L represents a linker;

$m_1$ is from 0.01 to 1;

$a_1$ is 0 or 1;

$n_3$ is a number from 0 to 0.99; and k is a number from 10 to 250.

The benzimidazole-based polymer may be a compound represented by Formula 171 below or a compound represented by Formula 172 below:

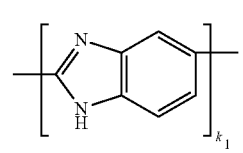
Formula 171 wherein in Formula 171, $k_1$ represents a degree of polymerization and is a number from 10 to 300,

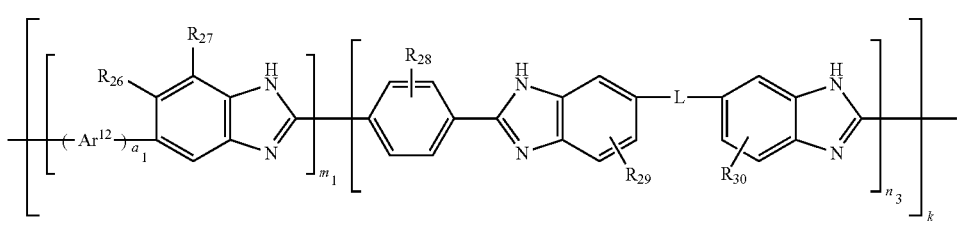
Formula 12

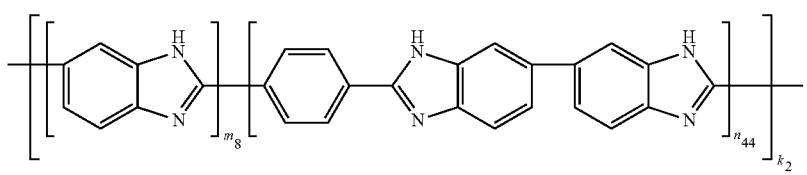

Formula 172 in Formula 172, $m_8$ is a number from 0.01 to 1; and $n_{44}$ is a number from 0 to 0.99; and $k_2$ is a number from 10 to 250.

In some embodiments, $m_8$ is 1, or a number from 0.1 to 0.9; and $n_{44}$ is 0 or a number from 0.1 to 0.9.

According to another embodiment of the present disclosure, a fuel cell is manufactured by disposing any of the electrolyte membranes according to the embodiments described above between two electrodes of the fuel cell. The electrodes of the fuel cell may each include a catalyst layer containing a catalyst and a binder.

The catalyst may be platinum (Pt), an alloy or a mixture of platinum (Pt) and at least one metal selected from the group consisting of gold (Au), palladium (Pd), rhodium (Ru), iridium (Ir), ruthenium (Ru), tin (Sn), molybdenum (Mo), cobalt (Co), and chromium (Cr). The Pt, the alloy, or the mixture may be supported on a carbonaceous support. For example, the catalyst may be at least one metal selected from the group consisting of Pt, a PtCo alloy, and a PtRu alloy. These metals may be supported on a carbonaceous support.

The binder may be at least one selected from the group consisting of poly(vinylidenefluoride), polytetrafluoroethylene (PTFE), tetrafluoroethylene-hexafluoroethylene copolymer, and perfluoroethylene.

The amount of the binder may be from about 0.001 parts by weight to about 0.5 parts by weight based on 1 part by weight of the catalyst. When the amount of the binder is within this range, the electrode catalyst layer may have strong binding ability to the support.

According to embodiments of the present invention, the fuel cell including the electrolyte membrane with high durability and conductivity may have improved cell performance, for example, in terms of lifespan and efficiency.

According to embodiments of the present invention, the fuel cell may have high performance in high-temperature, non-humidified conditions, for example, at a temperature of 100° C. or higher.

Substituents in the formulae above may be defined as follows.

As used herein, the term "alkyl" indicates a completely saturated, branched or unbranched (or a straight or linear) hydrocarbon.

Non-limiting examples of the "alkyl" group include methyl, ethyl, n-propyl, isopropyl, n-butyl, isobutyl, sec-butyl, t-butyl, isopentyl, neopentyl, n-hexyl, 3-methylhexyl, 2,2-dimethylpentyl, 2,3-dimethylpentyl, and n-heptyl.

At least one hydrogen atom of the alkyl group may be substituted with a halogen atom, a $C_1$-$C_{20}$ alkyl group substituted with a halogen atom (for example, $CCF_3$, $CHCF_2$, $CH_2F$, $CCl_3$, and the like), a $C_1$-$C_{20}$ alkoxy group, a $C_2$-$C_{20}$ alkoxyalkyl group, a hydroxyl group, a nitro group, a cyano group an amino group, an amidano group, hydrazine, hydrazone, a carboxyl group or a salt thereof, a sulfonyl group, a sulfamoyl group, a sulfonic acid group or a salt thereof, a phosphoric acid or a salt thereof, a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, a $C_7$-$C_{20}$ heteroarylalkyl group, a $C_6$-$C_{20}$ heteroaryloxyl group, a $C_6$-$C_{20}$ heteroaryloxyalkyl group, or a $C_6$-$C_{20}$ heteroarylalkyl group.

The term "halogen atom" indicates fluorine, bromine, chloride, iodine, and the like.

The term "$C_1$-$C_{20}$ alkyl group substituted with a halogen atom" indicates a $C_1$-$C_{20}$ alkyl group substituted with at least one halo group. Non-limiting examples of the $C_1$-$C_{20}$ alkyl group substituted with a halogen atom include monohaloalkyl, dihaloalkyl, or polyhaloalkyls such as perhaloalkyl.

Monohaloalkyls indicate alkyl groups including one iodine, bromine, chloride or fluoride. Dihaloalkyls and polyhaloalkyls indicate alkyl groups including at least two identical or different halo atoms.

As used herein, the term "alkoxy" represents "alkyl-O—", wherein the alkyl is the same as described above. Non-limiting examples of the alkoxy group include methoxy, ethoxy, propoxy, 2-propoxy, butoxy, t-butoxy, pentyloxy, hexyloxy, cyclopropoxy, and cyclohexyloxy. At least one hydrogen atom of the alkoxy group may be substituted with substituents that are the same as those recited above in conjunction with the alkyl group.

As used herein, the term "alkoxyalkyl" indicates an alkyl group with a substituent that is the same as that recited above in conjunction with the alkoxy group. At least one hydrogen atom of the alkoxyalkyl group be substituted with substituents that are the same as those recited above in conjunction with the alkyl group. As defined above, the term "alkoxyalkyl" refers to substituted alkoxyalkyl moieties.

As used herein, the term "alkenyl" indicates a branched or unbranched hydrocarbon with at least one carbon-carbon double bond. Non-limiting examples of the alkenyl group include vinyl, aryl, butenyl, isopropenyl, and isobutenyl. At least one hydrogen atom in the alkenyl group may be substituted with a substituent that is the same as that recited above in conjunction with the alkyl group.

As used herein, the term "alkynyl" indicated a branched or unbranched hydrocarbon with at least one carbon-carbon triple bond. Non-limiting examples of the "alkynyl" group include ethynyl, butynyl, isobutynyl, and isopropynyl.

At least one hydrogen atom of the "alkynyl" group may be substituted with substituents that are the same as those recited above in conjunction with the alkyl group.

As used herein, the term "aryl" group, which is used alone or in combination, indicates an aromatic hydrocarbon containing at least one ring.

The term "aryl" embraces a group with an aromatic ring fused to at least one cycloalkyl ring.

Non-limiting examples of the "aryl" group include phenyl, naphthyl, and tetrahydronaphthyl.

At least one hydrogen atom of the "aryl" group may be substituted with substituents that are the same as those recited above in conjunction with the alkyl group.

The term "arylalkyl" indicates an alkyl group substituted with an aryl group. Examples of the "arylalkyl" group include benzyl, phenyl-CH$_2$CH$_2$—, and the like.

As used herein, the term "aryloxy" indicates "—O-aryl". An example of the aryloxy group is phenoxy. At least one hydrogen atom of the "aryloxy" group may be substituted with substituents that are the same as those recited above in conjunction with the alkyl group.

As used herein, the term "heteroaryl group" indicates a monocyclic or bicyclic organic compound including at least one heteroatom selected from among nitrogen (N), oxygen (O), phosphorous (P), and sulfur (S), wherein the rest of the cyclic atoms are all carbon. The heteroaryl group may include, for example, one to five heteroatoms, and in some embodiments, may include a five- to ten-membered ring.

In the heteroaryl group, S or N may be present in various oxidized forms.

Non-limiting examples of the monocyclic heteroaryl group include thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiaxolyl, 1,2,3-thiadiazolyl, 1,2,4-thiadiazolyl, 1,2,5-thiadiazolyl, 1,3,4-thiazolyl, isothiazol-3-yl, isothiazol-4-yl, isothiazol-5-yl, oxazol-2-yl, oxazol-4-yl, oxazol-5-yl, isoxazol-3-yl, isoxazol-4-yl, isoxazol-5-yl, 1,2,4-triazol-3-yl, 1,2,4-triazol-5-yl, 1,2,3-triazol-4-yl, 1,2,3-triazol-5-yl, tetrazolyl, pyrid-2-yl, pyrid-3-yl, 2-pyrazin-2-yl, pyrazin-4-yl, pyrazin-5-yl, 2-pyrimidin-2-yl, 4-pyrimidin-2-yl, and 5-pyrimidin-2-yl.

The term "heteroaryl" indicates a heteroaromatic ring fused to at least one of an aryl group, a cycloaliphatic group, and a heterocyclic group.

Non-limiting examples of the bicyclic heteroaryl group include indolyl, isoindolyl, indazolyl, indolizinyl, purinyl, quinolizinyl, quinolinyl, isoquinolinyl, cinnolinyl, phthalazinyl, naphthyridinyl, quinazolinyl, quinaxalinyl, phenanthridinyl, phenathrolinyl, phenazinyl, phenothiazinyl, phenoxazinyl, benzisoqinolinyl, thieno[2,3-b]furanyl, furo[3,2-b]-pyranyl, 5H-pyrido[2,3-d]-o-oxazinyl, 1H-pyrazolo[4,3-d]-oxazolyl, 4H-imidazo[4,5-d]thiazolyl, pyrazino[2,3-d]pyridazinyl, imidazo[2,1-b]thiazolyl, imidazo[1,2-b][1,2,4]triazinyl, 7-benzo[b]thienyl, benzoxazolyl, benzimidazolyl, benzothiazolyl, benzoxapinyl, benzoxazinyl, 1H-pyrrolo[1,2-b][2]benzazapinyl, benzofuryl, benzothiophenyl, benzotriazolyl, pyrrolo[2,3-b]pyridinyl, pyrrolo[3,2-c]pyridinyl, pyrrolo[3,2-b]pyridinyl, imidazo[4,5-b]pyridinyl, imidazo[4,5-c]pyridinyl, pyrazolo[4,3-d]pyridinyl, pyrazolo[4,3-c]pyridinyl, pyrazolo[3,4-c]pyridinyl, pyrazolo[3,4-d]pyridinyl, pyrazolo[3,4-b]pyridinyl, imidazo[1,2-a]pyridinyl, pyrazolo[1,5-a]pyridinyl, pyrrolo[1,2-b]pyridazinyl, imidazo[1,2-c]pyrimidinyl, pyrido[3,2-d]pyrimidinyl, pyrido[4,3-d]pyrimidinyl, pyrido[3,4-d]pyrimidinyl, pyrido[2,3-d]pyrimidinyl, pyrido[2,3-b]pyrazinyl, pyrido[3,4-b]pyrazinyl, pyrimido[5,4-d]pyrimidinyl, pyrazino[2,3-b]pyrazinyl, and pyrimido[4,5-d]pyrimidinyl.

At least one hydrogen atom of the "heteroaryl" group may be substituted with substituents that are the same as those recited above in conjunction with the alkyl group.

The term "heteroarylalkyl" group indicates an alkyl group substituted with a heteroaryl group.

The term "heteroaryloxy" group indicates a "—O-heteroaryl moiety". At least one hydrogen atom of the heteroaryloxy group may be substituted with substituents that are the same as those recited above in conjunction with the alkyl group.

The term "heteroaryloxyalkyl" group indicates an alkyl group substituted with a heteroaryloxy group. At least one hydrogen atom of the heteroaryloxyalkyl group may be substituted with substituents that are the same as those recited above in conjunction with the alkyl group.

As used herein, the term "carbocyclic" group indicates a saturated or partially unsaturated non-aromatic monocyclic, bicyclic or tricyclic hydrocarbon group.

Non-limiting examples of the monocyclic hydrocarbon group include cyclopentyl, cyclopentenyl, cyclohexyl, and cyclohexenyl.

Non-limiting examples of the bicyclic hydrocarbon group include bornyl, decahydronaphthyl, bicyclo[2.1.1]hexyl, bicyclo[2.2.1]heptyl, bicyclo[2.2.1]heptenyl, and bicyclo[2.2.2]octyl.

An example of the tricyclic hydrocarbon group is adamantyl.

At least one hydrogen atom of the "carbocyclic group" may be substituted with substituents that are the same as those recited above in conjunction with the alkyl group.

As used herein, the term "heterocyclic group" indicates a five- to ten-membered ring including a heteroatom such as N, S, P, or O. An example of the heterocyclic group is pyridyl. At least one hydrogen atom in the heterocyclic group may be substituted with substituents that are the same as those recited above in conjunction with the alkyl group.

The term "heterocyclic oxy" indicates "—O-hetero ring". At least one hydrogen atom of the heterocyclic oxy group may be substituted with substituents that are the same as those recited above in conjunction with the alkyl group.

The term "sulfonyl" indicates R"—SO$_2$—, wherein R" is a hydrogen atom, alkyl, aryl, heteroaryl, aryl-alkyl, heteroaryl-alkyl, alkoxy, aryloxy, cycloalkyl, or a heterocyclic group.

The term "sulfamoyl" group refers to H$_2$NS(O$_2$)—, alkyl-NHS(O$_2$)—, (alkyl)$_2$NS(O$_2$)— aryl-NHS(O$_2$)—, alkyl-(aryl)-NS(O$_2$)—, (aryl)$_2$NS(O)$_2$, heteroaryl-NHS(O$_2$)—, (aryl-alkyl)-NHS(O$_2$)—, or (heteroaryl-alkyl)-NHS(O$_2$)—.

At least one hydrogen atom of the sulfamoyl group may be substituted with substituents that are the same as those recited above in conjunction with the alkyl group.

The term "amino group" indicates a group with a nitrogen atom covalently bonded to at least one carbon or hetero atom. The amino group may refer to, for example, —NH$_2$ and substituted moieties.

The term "amino group" also refers to an "alkylamino group" with nitrogen bound to at least one additional alkyl group, and "arylamino" and "diarylamino" groups with at least one or two nitrogen atoms bound to a selected aryl group.

The terms "alkylene", "alkenylene", "alkynylene", "arylene", and "heteroarylene" are respectively defined to be same as the monovalent "alkyl", "alkenyl", "alkynyl", "aryl" and "heteroaryl" described above, except that they are divalent groups.

At least one hydrogen atom of the respective "alkylene", "alkenylene", "alkynylene", "arylene", and "heteroarylene" groups may be substituted with substituents that are the same as those recited above in conjunction with the alkyl group.

Hereinafter, one or more embodiments of the present disclosure will be described in detail with reference to the following examples. These examples are not intended to limit the purpose and scope of the one or more embodiments of the present disclosure.

Example 1

Manufacture of Porous Membrane 50 g of a compound (tBuPha) of Formula 14 (6-tert-butyl-3-phenyl-3,4-dihydro-2H-benzo[e][1,3]oxazine 6-tert-butyl-3-phenyl-3,4-dihydro-2H-benzo[e][1,3]oxazine) below, 50 g of a compound (PBI) of Formula 10 below, and 428 g of N,N'-dimethylacetamide were mixed together, and then with 50 g of dibutyl phthalate to obtain a mixture.

Formula 14

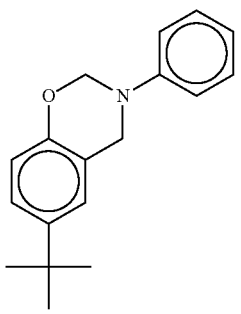

tBuPha

Formula 10

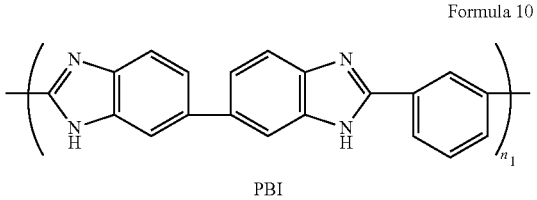

PBI wherein in Formula 10, $n_1$ was 30.

The mixture was cast on a glass substrate and heated at about 80° C. to remove the solvent, followed by a further thermal treatment at about 220° C.

Subsequently, the thermal-treated product was cooled to room temperature (about 25° C.), and then the film comprising the thermal-treated product was separated from the glass substrate. The film was immersed in methanol to separate dibutyl phthalate, thereby preparing a porous membrane.

Example 2

Manufacture of Porous Membrane

A porous membrane was manufactured in the same manner as in Example 1, except that 70 g of dibutyl phthalate were used.

Example 3

Manufacture of Porous Membrane

A porous membrane was manufactured in the same manner as in Example 1, except that 80 g of dibutyl phthalate were used.

Example 4

Manufacture of Porous Membrane

A porous membrane was manufactured in the same manner as in Example 1, except that 90 g of dibutyl phthalate were used.

Example 5

Manufacture of Porous Membrane

A porous membrane was manufactured in the same manner as in Example 1, except that 20 g of dibutyl phthalate were used.

Example 6

Manufacture of Porous Membrane

A porous membrane was manufactured in the same manner as in Example 1, except that 120 g of dibutyl phthalate were used.

Comparative Example 1

Manufacture of Polybenzimidazole (PBI) Porous Membrane 50 g of a compound (PBI) of Formula 10, 25 g of dibutyl phthalate, and 214 g of N,N'-dimethylacetamide were mixed together to obtain a mixture, which was then cast on a glass substrate, followed by removing the solvent and thermal treatment at about 80° C.

Subsequently, the thermal-treated product was cooled to room temperature (about 25° C.), and then the film comprising the thermal-treated product was separated from the glass substrate. The film was immersed in methanol to separate dibutyl phthalate, thereby preparing a PBI porous membrane.

Example 7

Manufacture of Electrolyte Membrane

The porous membrane of Example 2 was wet with an organic solvent N,N'-dimethylacetamide (DMAc), and then immersed in 100 g of a 5 wt % solution (about 30° C.) of the compound (PAE) of Formula 9 (n is 50, and $Z_1$ is K) in DMAc. Subsequently, the porous membrane was removed from the solution and then heated on a hot plate (about 60° C.) to evaporate the solvent, thereby obtaining a film.

The film was acid-treated with sulfuric acid, thereby completing the manufacture of an electrolyte membrane. The acid-treatment with sulfuric acid was as follows. The film was immersed in a 30° C., 4 wt % aqueous sulfuric acid solution for about 12 hours, and the sulfuric acid in the film was removed using distilled water.

Example 8

Manufacture of Electrolyte Membrane

An electrolyte membrane was manufactured in the same manner as in Example 7, except that the temperature of the 5 wt % solution of PAE in DMAc was changed to about 80° C.

Example 9

Manufacture of Electrolyte Membrane

The porous membrane of Example 3 was wet with an organic solvent N,N'-dimethylacetamide (DMAc), and then immersed in 100 g of a 5 wt % solution (about 30° C.) of the compound (PAE) of Formula 9 (n is 50, and $Z_1$ is K) in DMAc. Subsequently, the porous membrane was removed from the solution and then heated on a hot plate (about 60° C.) to evaporate the solvent, thereby obtaining a film.

The film was acid-treated with sulfuric acid, thereby completing the manufacture of an electrolyte membrane.

Example 10

Manufacture of Electrolyte Membrane

An electrolyte membrane was manufactured in the same manner as in Example 9, except that the temperature of the 5 wt % solution of PAE in DMAc was changed to about 80° C.

Example 11

Manufacture of Electrolyte Membrane

The porous membrane of Example 4 was wet with an organic solvent N-methylpyrrolidone (NMP), and then immersed in 100 g of a 5 wt % solution (about 30° C.) of the compound (PAE) of Formula 9 (n is 20, and $Z_1$ is K) in a NMP/DMF (dimethylformamide) solution. The mixing ratio of NMP to DMF was 50:50 by volume.

Subsequently, the porous membrane was removed from the solution and then heated on a hot plate (about 60° C.) to evaporate the solvent, thereby obtaining a film.

The film was acid-treated with sulfuric acid, thereby completing the manufacture of an electrolyte membrane. The acid-treatment with sulfuric acid was as follows. The film was immersed in a 30° C., 4 wt % aqueous sulfuric acid solution for about 12 hours, and the sulfuric acid in the film was removed using distilled water.

Example 12

Manufacture of Electrolyte Membrane

An electrolyte membrane was manufactured in the same manner as in Example 11, except that the temperature of the 5 wt % solution of PAE in the NMP/DMF solution was changed to about 80° C.

Example 13

Manufacture of Electrolyte Membrane

An electrolyte membrane was manufactured in the same manner as in Example 8, except that, instead of 100 g of the 5 wt % solution of PAE in DMAc, 100 g of a 15 wt % solution of PAE in DMAc was used.

Example 14

Manufacture of Electrolyte Membrane

An electrolyte membrane was manufactured in the same manner as in Example 10, except that, instead of 100 g of the 5 wt % solution of PAE in DMAc, 100 g of a 15 wt % solution of PAE in DMAc was used.

Example 15

Manufacture of Electrolyte Membrane

An electrolyte membrane was manufactured in the same manner as in Example 12, except that, instead of 100 g of the 5 wt % solution of PAE in DMAc, 100 g of a 15 wt % solution of PAE in DMAc was used.

Comparative Example 2

It was intended to impregnate pores of the PBI porous membrane of Comparative Example 1 with the compound (PAE) of Formula 9 (n is 20, and $Z_1$ is K). However, it was impossible to impregnate the PBI porous membrane with PAE due to the dissolution of PAE in N,N'-dimethylacetamide (DMAc).

Manufacture Example 1

Manufacture of Fuel Cell 1 g of a catalyst including 50% by weight of PtCo loaded on carbon, and 3 g of N-pyrrolidone (NMP) as a solvent were added to a stirring vessel, and the mixture was stirred to prepare a slurry. Subsequently, a solution of 5 wt % of polyvinylidene fluoride in N-pyrrolidone (NMP) was added to the slurry until the amount of polyvinylidene fluoride in the mixture reached 0.025 g. The mixture was mixed for 10 minutes to prepare a slurry for forming a cathode catalyst layer.

Carbon paper was cut to a size of 4 7 $cm^2$, fixed on a glass plate, and coated with the slurry by using a doctor blade (Sheen Instruments Ltd) with a gap of about 600 µm.

The slurry for the cathode catalyst layer was coated on the carbon paper by using a doctor blade (Sheen Instrument) with a gap of 600 µm, and dried at room temperature for one hour, at 80° C. for one hour, at 120° C. for 30 minutes, and at 150° C. for 15 minutes to form cathodes (fuel electrodes).

Anodes were manufactured as follows. 2 g of a Pt catalyst (50 wt % of Pt supported on carbon) and 9 g of N-methylpyrrolidone (NMP) solvent were put into a stirring vessel, and stirred using a high-speed stirrer for two minutes.

Subsequently, a solution of 0.05 g of polyvinylidene fluoride dissolved in 1 g of NMP was added to the mixture, and the resultant was further stirred for 2 minutes to prepare a slurry for an anode catalyst layer. The slurry was coated on carbon paper, which was coated with a microporous layer, using a bar coater, to complete the manufacture of the anode.

The electrolyte membrane of Example 8 was disposed between the cathode and the anode to manufacture an MEA. The cathode, anode, and electrolyte membrane were used without being impregnated with phosphoric acid.

To prevent gas permeation between the cathode and the anode, a polytetrafluoroethylene (PTFE) membrane main-gasket having a thickness of 200 µm and a PTFE membrane sub-gasket having a thickness of 20 µm were joined and disposed between each of the anode and cathode, and the electrolyte membrane. The pressure applied to the MEAs was adjusted using a torque wrench.

Manufacture Examples 2 to 6

Manufacture of Fuel Cell

Fuel cells were manufactured in the same manner as in Manufacture Example 8, except that the electrolyte membranes of Examples 10, 12, 13, 14, and 15 were respectively used, instead of the electrolyte membrane of Example 8.

Evaluation Example 1

Density of Porous Membrane

Cross-sections of the porous membranes manufactured according to Examples 1-4 were observed using scanning electron microscopy (SEM). The results are shown in FIGS. 1 to 4, respectively.

Referring to FIGS. 1 to 4, the membranes of Examples 1-4 were found to have pores. Densities of the porous membranes manufactured according to Examples 1-4 and Comparative Example 1 were measured using an AutoPore IV 9500 (available from MicroMeritics Inc.). The results are shown in Table 1.

TABLE 1

| Example | Amount of DBP (parts by weight*) | Density (g/cm$^3$) |
|---|---|---|
| Example 1 | 50 | 0.77 |
| Example 2 | 70 | 0.57 |
| Example 3 | 80 | 0.55 |
| Example 4 | 90 | 0.51 |
| Comparative Example 1 | 50 | 1.32 |

The unit "parts by weight" refers to the amount of DBP based on 100 parts by weight of the total weight of the compound (tBuPha) of Formula 14 and the compound of Formula 10 in Examples 1-4, and refers to the amount of DBP based on 100 parts by weight of PBI in Comparative Example 1.

It can be seen from Table 1 that the density of the porous membrane decreased as the amount of DBP increased in the porous membranes of Examples 1-4.

Evaluation Example 2

Total Pore Area, Average Pore Diameter, and Porosity of Porous Membrane

Total pore areas, average pore diameters, and porosities of the porous membranes manufactured according to Examples 1-6 were measured using an AutoPore IV 9500 (available from MicroMeritics Inc.). The results are shown in Table 2 below.

TABLE 2

| Example | Total pore area (m$^2$/g) | Average pore diameter | Porosity (%) |
|---|---|---|---|
| Example 1 | 171.623 | 307 Å (0.0307 μm) | 65.5743 |
| Example 2 | 147.49 | 421 Å (0.0421 μm) | 65.69 |
| Example 3 | 113.545 | 463 Å (0.0463 μm) | 66.2551 |
| Example 4 | 115.623 | 513 Å (0.0513 μm) | 65.0011 |
| Example 5 | 123.191 | 239 Å (0.0239 μm) | 43.9879 |
| Example 6 | 107.241 | 631 Å (0.0631 μm) | 65.8875 |

Evaluation Example 3

Weight Gain of Electrolyte Membrane

Weight gains of the electrolyte membranes manufactured according to Examples 7-12 were calculated using the following equation. The results are shown in Table 3 below.

Weight gain (%)=(Wmem−Wsub)/Wsub100    [Equation 1]

Where "Wmem" and "Wsub" in Equation 1 indicate the weights of the electrolyte membrane and the porous membrane, respectively.

Figure 5:
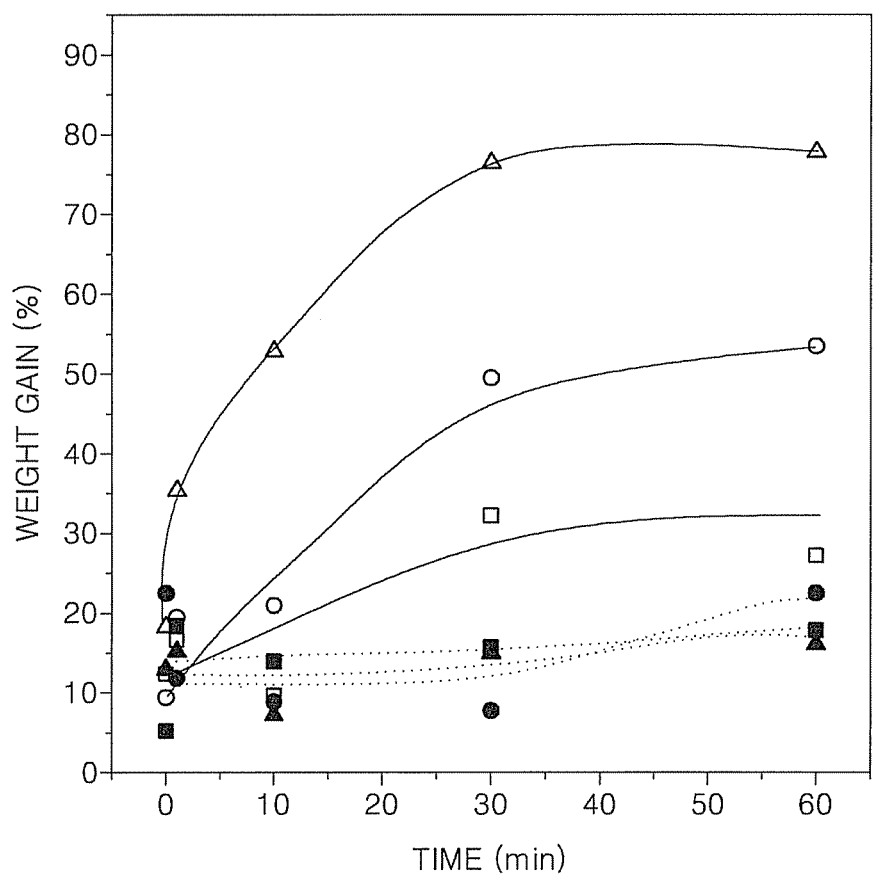
FIG. 5 is a graph illustrating weight gains with respect to time in electrolyte membranes of Examples 7 to 12.

FIG. 5 is a graph of change in weight gain with respect to immersion time of the electrolyte membranes of Example 12 (denoted by Δ), Example 11 (▲), Example 10 (□), Example 9 (■), Example 8 (○), and Example 7 (•). Referring to FIG. 5, the weight gain of the electrolyte membrane was found to be greater with the higher temperature of the PAE solution, the larger amount of DBP, and the longer immersion time.

Evaluation Example 4

Weight Change Rate of Electrolyte Membrane

A leaching test was performed on the electrolyte membranes of Examples 8, 10, and 12 according to the following method.

Weight change rates of the electrolyte membranes manufactured with the PAE-impregnated porous membrane were calculated using the following equation 2, respectively, after immersion in water at about 25° C. for about 24 hours and after immersion in water at about 80° for about 48 hours. The results are also shown in Table 3 below.

Weight change rate (%)=[Weight(after immersion)−Weight (before immersion)]/Weight(before immersion)]100    [Equation 2]

TABLE 3

| Example | Weight gain (%) | Weight of electrolyte membrane after immersion | Weight change rate of electrolyte membrane after immersion in water at room temperature (about 25° C.) for 24 hours | | Weight change rate of electrolyte membrane after immersion in water at about 80° C. for 48 hours | |
|---|---|---|---|---|---|---|
| Example 8 | 27.07 | 13.2 mg | 13.4 mg | 02% | 13.4 mg | 02% |
| Example 10 | 20.84 | 11.5 mg | 11.7 mg | 02% | 12.0 mg | 04% |
| Example 12 | 53.40 | 15.3 mg | 15.3 mg | 00% | 15.7 mg | 03% |

The leaching out test was to evaluate the degree of leaching of PAE out of the pores of the porous membrane in water conditions. Referring to Table 3, the electrolyte membranes of Examples 8, 10, and 12 were found to have undergone no weight change even after the immersion for long time in water both at room temperature and at high temperature. The PAE in the electrolyte membranes of Examples 8, 10, and 12, though inherently insoluble in water, forms an ionic bond with the porous membrane forming material in each electrolyte membrane, and thus is prevented from leaching out of the electrolyte membrane, which leads to nearly no weight change in the electrolyte membranes of Examples 8, 10, and 12 as described above.

Evaluation Example 5

Conductivity of Electrolyte Membrane

Ionic conductivity with respect to relative humidity of the electrolyte membranes of Examples 8, 10, 12, 13, 14, and 15 was measured according to the following method.

Conductance of each electrolyte membrane was measured using a constant current, 4-point probe method. Conductivity of each electrolyte membrane was obtained by measuring alternating potential differences across the ends of the electrolyte membrane with an application of a constant alternating current to the ends of the electrolyte membrane in a chamber at a temperature of 30° C. to 120° C. and a relative humidity of 20% to 100%.

Figure 6:
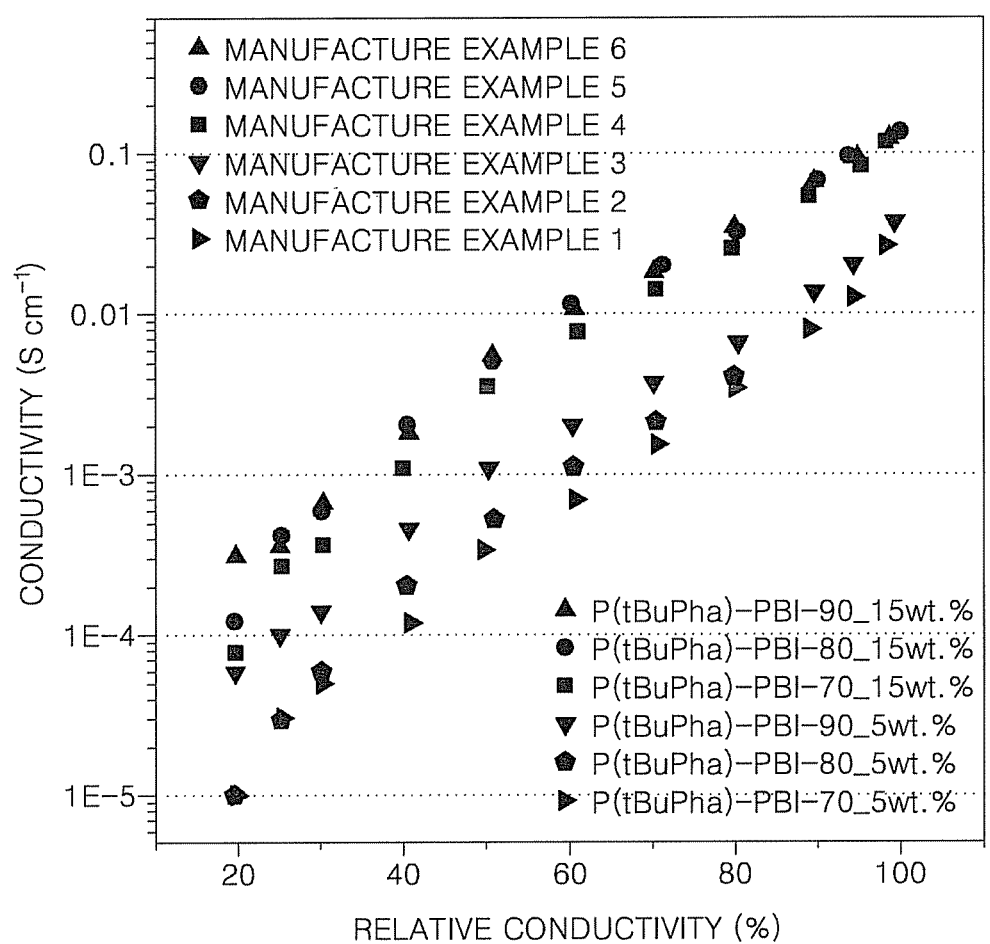
FIG. 6 is a graph of conductivity with respect to relative humidity of electrolyte membranes of Examples 8, 10, and 12-15.

The results of the conductivity measurement with respect to relative humidity are shown in FIG. 6. Referring to FIG. 6, the electrolyte membranes of Examples 8, 10, and 12-15 (Manufacture Examples 1-6, respectively) were found to have high conductivity characteristics.

Evaluation Example 6

Cell Performance of Fuel Cell

Electricity was generated by supplying hydrogen to the anode (flow rate: 100 ccm) of the fuel cells manufactured according to Manufacture Examples 1-6 and air to the cathode (flow rate: 250 ccm) at about 120° C. and different relative humidities. The fuel cells were found to have high cell performance.

As described above, according to the one or more of the above embodiments of the present invention, a porous membrane with high chemical and mechanical stabilities can be provided, and thus is appropriate for use in improved fuel cells. An electrolyte membrane manufactured by impregnating such a porous membrane with a proton-conductive polymer is also applicable to improved fuel cells. Using the electrolyte membrane, a fuel cell with improved cell performance, for example, in terms of lifespan and efficiency may be manufactured.

While the present invention has been particularly shown and described with reference to exemplary embodiments thereof, it will be understood by those of ordinary skill in the art that various changes in form and details may be made therein without departing from the spirit and scope of the present disclosure as defined by the following claims.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrolyte membrane comprising: a porous membrane; and a proton-conductive polymer that is disposed in pores of the porous membrane, wherein the porous membrane has pores, and comprises a polymerization product of at least one of the compounds represented by Formulae 2 to 6 below and a polyazole-based material, wherein the porous membrane has an average pore diameter from about 0.001 μm to about 0.5 μm:

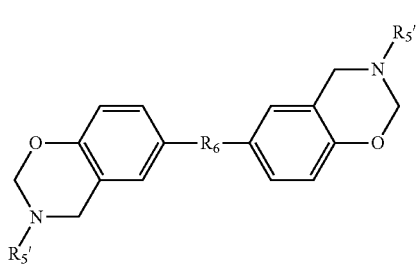

Formula 2 wherein in Formula 2, R5' is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group; and R6 is selected from the group consisting of a substituted or unsubstituted C1-C20 alkylene group, a substituted or unsubstituted C2-C20 alkenylene group, a substituted or unsubstituted C2-C20 alkynylene group, a substituted or unsubstituted C6-C20 arylene group, a substituted or unsubstituted C2-C20 heteroarylene group, —C(=O)—, and —SO2-,

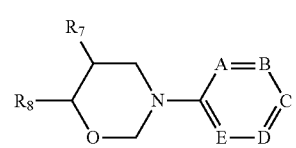

Formula 3 wherein in Formula 3, A, B, C, D and E are all carbon; or one or two of A, B, C, D and E is nitrogen and the others are carbon, and R7 and R8 are linked to form a ring, wherein the ring is a C6-C10 cycloalkyl group, a C3-C10 heteroaryl group, a fused C3-C10 heteroaryl group, a C3-C10 heterocyclic group or a fused C3-C10 heterocyclic group,

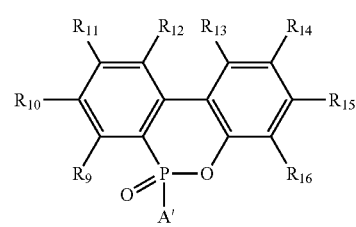

Formula 4 wherein in Formula 4, A' is a substituted or unsubstituted C1-C20 heterocyclic group, a substituted or unsubstituted C4-C20 cycloalkyl group, or a substituted or unsubstituted C1-C20 alkyl group; and R9 to R16 are each independently a hydrogen atom, a C1-C20 alkyl group, a C1-C20 alkoxy group, a C6-C20 aryl group, a C6-C20 aryloxy group, a C1-C20 heteroaryl group, a C1-C20 heteroaryloxy group, a C4-C20 cycloalkyl group, a C1-C20 heterocyclic group, a halogen atom, a cyano group, or a hydroxy group, Formula 5

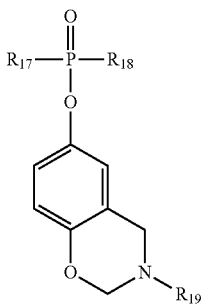

wherein in Formula 5, R17 and R18 are each independently a C1-C20 alkyl group, a C1-C20 alkoxy group, a C6-C20 aryl group, a C6-C20 aryloxy group or a group represented by Formula 5A below:

Formula 5A

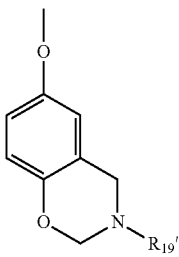

wherein in Formulae 5 and 5A, R19 and R19' are each independently a hydrogen atom, a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 cycloalkyl group, a halogenated C4-C20 cycloalkyl group, a C1-C20 heterocyclic group or a halogenated C1-C20 heterocyclic group, Formula 6

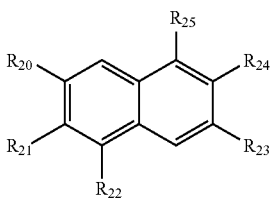

wherein in Formula 6, at least two adjacent groups selected from among R20, R21, and R22 are linked to form a group represented by Formula 6A below;

the unselected rest of R20, R21 and R22 is a hydrogen atom, a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 carbon ring group, a halogenated C4-C20 carbon ring group, a C1-C20 heterocyclic group or a halogenated C1-C20 heterocyclic group;

at least two adjacent groups selected from among R23, R24, and R25 are linked to form a group represented by Formula 6A below; and the unselected rest of R23, R24 and R25 is a hydrogen atom, a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 carbon ring group, a halogenated C4-C20 carbon ring group, a C1-C20 heterocyclic group or a halogenated C1-C20 heterocyclic group, Formula 6A

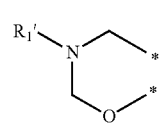

wherein in Formula 6A, R1' is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbon ring group, a substituted or unsubstituted C4-C20 carbocyclic alkyl group, a substituted or unsubstituted C2-C20 heterocyclic group, or a substituted or unsubstituted C2-C20 heterocyclic alkyl group; and * denotes the sites at which the at least two adjacent groups selected from among R20, R21 and R22 of Formula 6 and the at least two adjacent groups selected from among R23, R24 and R25 are linked, respectively, wherein the amount of the proton-conductive polymer is from about 10 parts to about 150 parts by weight based on 100 parts by weight of the porous membrane.

2. The electrolyte membrane of claim 1, wherein the polymerization product of the at least one of the compounds represented by Formulae 2 to 6 and the polyazole-based material and the proton-conductive polymer are bound by a chemical bond, and the polymerization product is insoluble in a solvent that dissolves the proton-conductive polymer.

3. The electrolyte membrane of claim 1, wherein the solvent comprises at least one solvent selected from the group consisting of N-methylpyrrolidone (NMP), N,N'-dimethylacetamide (DMAc), and N,N'-dimethylformamide.

4. The electrolyte membrane of claim 1, wherein the proton-conductive polymer comprises a sulfonated polymer.

5. The electrolyte membrane of claim 1, wherein the sulfonated polymer comprises at least one polymer selected from the group consisting of sulfonated polyarylene ether, sulfonated polyarylene ether sulfone, sulfonated polyimide, and sulfonated polyether ether ketone.

6. The electrolyte membrane of claim 1, wherein the sulfonated polymer comprises a polymer including a repeating unit represented by Formula 8A below or a repeating unit represented by Formula 8B, or a polymer represented by Formula 9A below:

Formula 8A

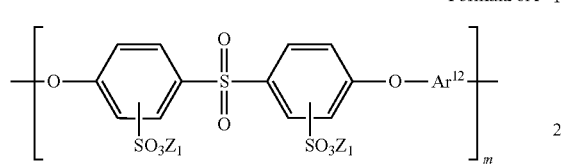

Formula 8B

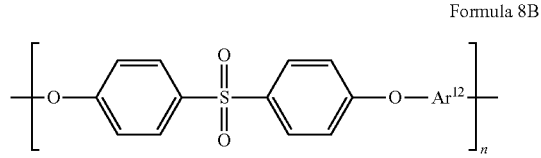

in Formulae 8A and 8B, $Ar^{12}$ is a substituted or unsubstituted $C_6$-$C_{20}$ arylene group, or a substituted or unsubstituted $C_2$-$C_{20}$ heteroarylene group; and
$Z_1$ is a hydrogen atom, Na, or K; and m and n are each a mole fraction of from 0.01 to 0.99, Formula 9A

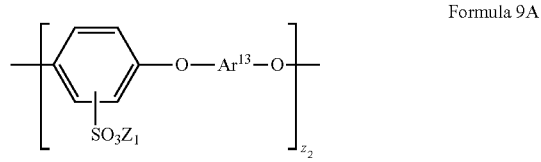

in Formula 9A, $Ar^{13}$ is a substituted or unsubstituted $C_6$-$C_{20}$ arylene group, or a substituted or unsubstituted $C_2$-$C_{20}$ heteroarylene group;
$Z_1$ is a hydrogen atom, Na, or K; and
$Z_2$ represents a degree of polymerization of from about 20 to about 600.

7. The electrolyte membrane of claim 1, wherein the sulfonated polyarylene ether sulfone polymer comprises a compound represented by Formula 8 or Formula 9 below:

in Formula 8, $Z_1$ is a hydrogen atom, Na, or K; and m and n are each a mole fraction of from 0.01 to 0.99, Formula 9

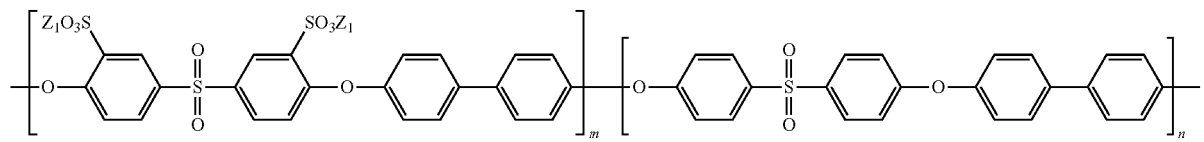

in Formula 9, $Z_1$ is a hydrogen atom, Na, or K; and
n is a degree of polymerization of from about 20 to about 600.

8. A method of preparing the electrolyte membrane of claim 1, the method comprising:
mixing a proton-conductive polymer and an organic solvent to obtain a proton-conductive polymer solution; and
impregnating the pores of a porous membrane with a proton-conductive polymer contained in the proton-conductive polymer solution.

9. The method of claim 8, further comprising a protonating process.

10. The method of claim 9, wherein the protonating process comprises an acid treatment process using sulfuric acid.

11. The method of claim 8, wherein the impregnation of the pores of the porous membrane with the proton-conductive polymer comprises immersing the porous membrane in the proton-conductive polymer solution.

12. The method of claim 11, wherein the concentration of the proton-conductive polymer in the proton-conductive polymer solution is from about 5 parts by weight to about 15 parts by weights based on 100 parts by weight of the total weight of the proton-conductive polymer solution.

13. The method of claim 11, wherein the temperature of the proton-conductive polymer solution is from about 30° C. to about 80° C.

14. A fuel cell comprising the porous membrane according to claim 1.

15. A fuel cell comprising: the porous membrane of claim 1; and an electrolyte membrane including a proton-conductive polymer impregnated in pores of the porous membrane.

16. The electrolyte membrane of claim 1, wherein the porous membrane has a total pore area of from about 100 $m^2$/g to about 200 $m^2$/g.

17. The electrolyte membrane of claim 1, wherein the porous membrane has a porosity of from about 40% to about 80%, an average pore diameter from about 0.001 μm to about 0.5 μm, and a density from about 0.3 g/$cm^3$ to about 1.5 g/$cm^3$.

Formula 8

18. The electrolyte membrane of claim 1, wherein the amount of the polyazole-based material is from about 5 parts to about 210 parts by weight based on 100 parts by weight of at least one of the compounds of Formulae 2 through 6.

19. The electrolyte membrane of claim 1, wherein the polyazole-based material comprises at least one material selected from among the compounds represented by Formulae 10 to 12 below:

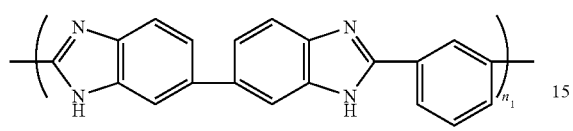

Formula 10 wherein, in Formula 10, $n_1$ is an integer of 10 or greater;

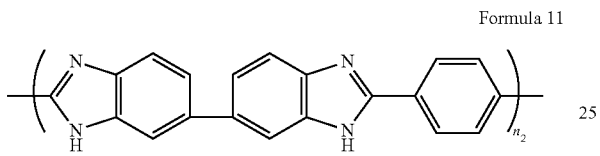

Formula 11 wherein in Formula 11, $n_2$ is an integer of 10 or greater;

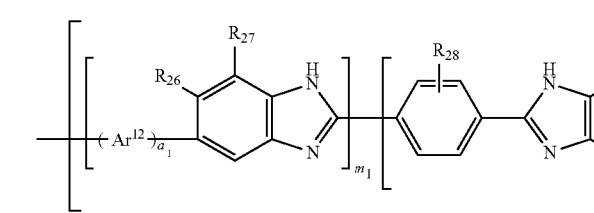

Formula 12 wherein in Formula 12, $R_{26}$ and $R_{27}$ are each independently a hydrogen atom, an unsubstituted or substituted $C_1$-$C_{20}$ alkyl group, a unsubstituted or substituted $C_1$-$C_{20}$ alkoxy group, an unsubstituted or substituted $C_6$-$C_{20}$ aryl group, an unsubstituted or substituted $C_6$-$C_{20}$ aryloxy group, an unsubstituted or substituted $C_3$-$C_{20}$ heteroaryl group, or an unsubstituted or substituted $C_3$-$C_{20}$ heteroaryloxy group, wherein $R_{26}$ and $R_{27}$ may be linked to form a $C_4$-$C_{20}$ carbon ring or a $C_3$-$C_{20}$ hetero ring;

$Ar^{12}$ is a substituted or unsubstituted $C_6$-$C_{20}$ arylene group or a substituted or unsubstituted $C_3$-$C_{20}$ heteroarylene group;

$R_{28}$ to $R_{30}$ are each independently a single or a multi-substituted substituent selected from the group consisting of a hydrogen atom, a substituted or unsubstituted $C_1$-$C_{20}$ alkyl group, a substituted or unsubstituted $C_1$-$C_{20}$ alkoxy group, a substituted or unsubstituted $C_6$-$C_{20}$ aryl group, a substituted or unsubstituted $C_6$-$C_{20}$ aryloxy group, a substituted or unsubstituted $C_6$-$C_{20}$ heteroaryl group, and a substituted or unsubstituted $C_3$-$C_{20}$ heteroaryloxy group;

L represents a linker;

$m_1$ is from 0.01 to 1;

$a_1$ is 0 or 1;

$n_3$ is a number from 0 to 0.99; and k is a number from 10 to 250.

20. The electrolyte membrane of claim 1, wherein at least one of the compounds represented by Formulae 2 to 6 comprises a compound represented by and the polyazole-based material comprises at least one of the compounds represented by Formulae 10 to 11 below:

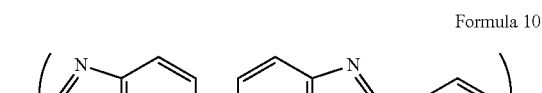

Formula 10

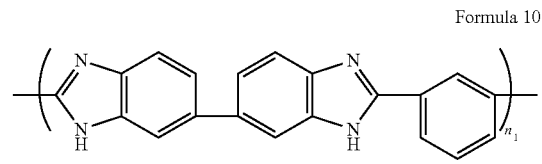

Formula 10 wherein, in Formula 10, $n_2$ is an integer of 10 or greater,

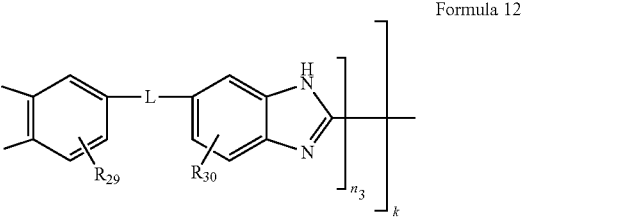

Formula 11 wherein in Formula 11, $n_2$ is an integer of 10 or greater.

21. The electrolyte membrane of claim 1, wherein the porous membrane has an average pore diameter from about 0.02 μm to about 0.07 μm.

22. An electrolyte membrane comprising: a porous membrane; and a proton-conductive polymer that is disposed pores of the porous membrane, wherein the porous membrane has pores, and comprises a polymerization product of at least one of the compounds represented by Formulae 1 to 6 below and a polyazole-based material, wherein the porous membrane has an average pore diameter from 0.001 μm to 0.5 μm, and the porous membrane has a density from about 0.3 g/cm3 to about 1.5 g/cm³:

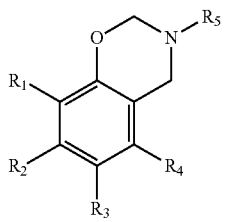

Formula 1 wherein, in Formula 1, R1, R2, R3 and R4 are each independently a hydrogen atom, a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C2-C20 heteroaryl group, a substituted or unsubstituted C2-C20 heteroaryloxy group, a substituted or unsubstituted C4-C20 carbocyclic group, a substituted or unsubstituted C4-C20 carbocyclic alkyl group, a substituted or unsubstituted C2-C20 heterocyclic group, a halogen atom, a hydroxy group, or a cyano group; and R5 is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group,

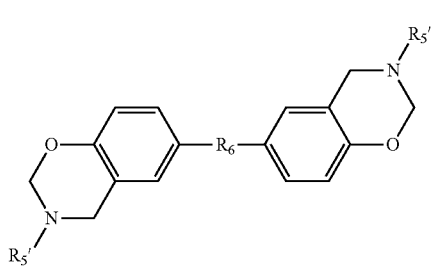

Formula 2 wherein in Formula 2, R5' is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbocyclic group, a substituted or unsubstituted C4-C20 carbocyclic alkyl group, a substituted or unsubstituted C2-C20 heterocyclic group, or a substituted or unsubstituted C2-C20 heterocyclic alkyl group; and R6 is selected from the group consisting of a substituted or unsubstituted C1-C20 alkylene group, a substituted or unsubstituted C2-C20 alkenylene group, a substituted or unsubstituted C2-C20 alkynylene group, a substituted or unsubstituted C6-C20 arylene group, a substituted or unsubstituted C2-C20 heteroarylene group, —C(=O)—, and —SO2-,

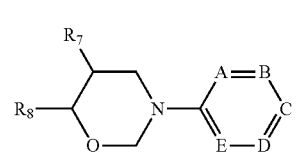

Formula 3 wherein in Formula 3, A, B, C, D and E are all carbon; or one or two of A, B, C, D and E is nitrogen and the others are carbon, and R7 and R8 are linked to form a ring, wherein the ring is a C6-C10 cycloalkyl group, a C3-C10 heteroaryl group, a fused C3-C10 heteroaryl group, a C3-C10 heterocyclic group or a fused C3-C10 heterocyclic group,

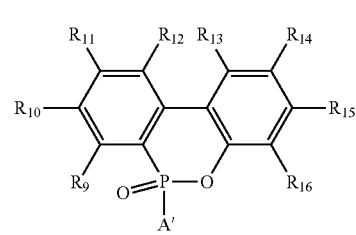

Formula 4 wherein in Formula 4, A' is a substituted or unsubstituted C1-C20 heterocyclic group, a substituted or unsubstituted C4-C20 cycloalkyl group, or a substituted or unsubstituted C1-C20 alkyl group; and R9 to R16 are each independently a hydrogen atom, a C1-C20 alkyl group, a C1-C20 alkoxy group, a C6-C20 aryl group, a C6-C20 aryloxy group, a C1-C20 heteroaryl group, a C1-C20 heteroaryloxy group, a C4-C20 cycloalkyl group, a C1-C20 heterocyclic group, a halogen atom, a cyano group, or a hydroxy group,

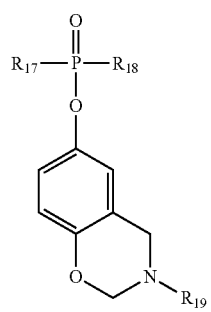

Formula 5 wherein in Formula 5, R17 and R18 are each independently a C1-C20 alkyl group, a C1-C20 alkoxy group, a C6-C20 aryl group, a C6-C20 aryloxy group or a group represented by Formula 5A below:

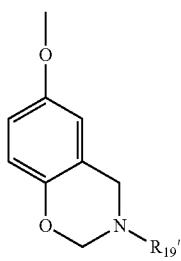

Formula 5A wherein in Formulae 5 and 5A, R19 and R19' are each independently a hydrogen atom, a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 cycloalkyl group, a halogenated C4-C20 cycloalkyl group, a C1-C20 heterocyclic group or a halogenated C1-C20 heterocyclic group,

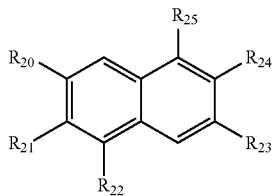

Formula 6 wherein in Formula 6, at least two adjacent groups selected from among R20, R21, and R22 are linked to form a group represented by Formula 6A below;
the unselected rest of R20, R21 and R22 is a hydrogen atom, a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 carbon ring group, a halogenated C4-C20 carbon ring group, a C1-C20 heterocyclic group or a halogenated C1-C20 heterocyclic group;
at least two adjacent groups selected from among R23, R24, and R25 are linked to form a group represented by Formula 62A below; and
the unselected rest of R23, R24 and R25 is a hydrogen atom, a C1-C20 alkyl group, a C1-C20 alkoxy group, a C6-C20 aryl group, a C6-C20 aryloxy group, a halogenated C6-C20 aryl group, a halogenated C6-C20 aryloxy group, a C1-C20 heteroaryl group, a C1-C20 heteroaryloxy group, a halogenated C1-C20 heteroaryl group, a halogenated C1-C20 heteroaryloxy group, a C4-C20 carbon ring group, a halogenated C4-C20 carbon ring group, a C1-C20 heterocyclic group or a halogenated C1-C20 heterocyclic group,

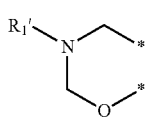

Formula 6A wherein in Formula 6A, R1' is a substituted or unsubstituted C1-C20 alkyl group, a substituted or unsubstituted C1-C20 alkoxy group, a substituted or unsubstituted C2-C20 alkenyl group, a substituted or unsubstituted C2-C20 alkynyl group, a substituted or unsubstituted C6-C20 aryl group, a substituted or unsubstituted C6-C20 aryloxy group, a substituted or unsubstituted C7-C20 arylalkyl group, a substituted or unsubstituted C2-C20 heteroaryl group, a substituted or unsubstituted C2-C20 heteroaryloxy group, a substituted or unsubstituted C2-C20 heteroarylalkyl group, a substituted or unsubstituted C4-C20 carbon ring group, a substituted or unsubstituted C4-C20 carbocyclic alkyl group, a substituted or unsubstituted C2-C20 heterocyclic group, or a substituted or unsubstituted C2-C20 heterocyclic alkyl group; and
* denotes the sites at which the at least two adjacent groups selected from among $R_{20}$, $R_{21}$ and $R_{22}$ of Formula 6 and the at least two adjacent groups selected from among $R_{23}$, $R_{24}$ and $R_{25}$ are linked, respectively, wherein the amount of the proton-conductive polymer is from about 10 parts to about 150 parts by weight based on 100 parts by weight of the porous membrane.

* * * * *